US012706858B2

(12) United States Patent
Matthews

(10) Patent No.: US 12,706,858 B2
(45) Date of Patent: Aug. 11, 2026

(54) MACHINE LEARNING-ENABLED QUEUE MANAGEMENT FOR NETWORK DEVICES

(71) Applicant: Marvell Asia Pte Ltd, Singapore (SG)

(72) Inventor: William Brad Matthews, Los Gatos, CA (US)

(73) Assignee: Marvell Asia Pte Ltd, Singapore (SG)

( * ) Notice: Subject to any disclaimer, the term of this patent is extended or adjusted under 35 U.S.C. 154(b) by 60 days.

(21) Appl. No.: 18/360,727

(22) Filed: Jul. 27, 2023

(65) Prior Publication Data

US 2025/0039104 A1 Jan. 30, 2025

(51) Int. Cl.
*H04L 47/62* (2022.01)
*H04L 41/16* (2022.01)
*H04L 47/32* (2022.01)

(52) U.S. Cl.
CPC .......... *H04L 47/6215* (2013.01); *H04L 41/16* (2013.01); *H04L 47/32* (2013.01)

(58) Field of Classification Search
CPC ...... H04L 47/6215; H04L 41/16; H04L 47/32
See application file for complete search history.

(56) References Cited

U.S. PATENT DOCUMENTS 6,384,747 B1 * 5/2002 Reed ........................ H03M 7/48 341/59
12,593,301 B2 * 3/2026 Ying ...................... H04W 64/00
2006/0050640 A1 * 3/2006 Jin ........................... H04L 69/16 370/235
2012/0278442 A1 * 11/2012 Saika .................... G06F 3/0647 709/219
2016/0134755 A1 * 5/2016 Carlson .................. G16H 80/00 379/265.12
2016/0135075 A1 * 5/2016 Wigren ................. H04W 28/12 370/235
2020/0280518 A1 * 9/2020 Lee ........................ H04L 47/115
2021/0344601 A1 * 11/2021 Ye ........................... H04L 47/33
2022/0150171 A1 * 5/2022 Matthews ............... H04L 47/56
2022/0400083 A1 * 12/2022 Chandrasekaran ... H04L 47/562
2023/0164078 A1 * 5/2023 Li ........................... H04L 47/12 370/235
2023/0195624 A1 * 6/2023 Majumdar ............ G06F 12/127 711/133

(Continued)

*Primary Examiner* — Dhairya A Patel
(74) *Attorney, Agent, or Firm* — Colby Nipper PLLC

(57) ABSTRACT

The present disclosure describes apparatuses and methods for machine learning-enabled (ML-enabled) queue management for network devices. In some aspects, an ML-enabled queue manager of a network device initializes a queue management setting with a randomized value and the device processes packets through the queue based on the queue management setting. The ML-enabled queue manager measures a performance metric of the queue and provides, to an ML algorithm, an indication of the queue management setting and an indication of the performance metric of the queue. The ML-enabled queue manager then receives, from the machine learning algorithm, an updated queue management setting and configures the queue with the updated queue management setting to process subsequent packets based on the updated queue management setting. By so doing, the ML-enabled queue manager may tune one or more queue management settings of the queue to optimize performance of the network device.

20 Claims, 12 Drawing Sheets

(56) References Cited

U.S. PATENT DOCUMENTS

| | | | | |
|---|---|---|---|---|
| 2024/0195690 | A1* | 6/2024 | Kattepur | H04L 41/0894 |
| 2024/0333631 | A1* | 10/2024 | Zafer | H04L 45/70 |
| 2024/0388541 | A1* | 11/2024 | Tourrilhes | H04L 47/115 |
| 2025/0007854 | A1* | 1/2025 | Radi | H04L 67/1097 |

* cited by examiner

Queue Management Settings 318
Minimum Threshold 504
Maximum Threshold 506
Maximum Probability 508

Initialize a queue management setting 702

Select a queue management setting 704

Apply the queue management setting to a queue of a network device 706

Measure a performance metric of the queue of the network device 708

Provide, to a machine learning algorithm, an indication of the performance metric of the queue and an indication of the queue management setting 710

Receive, from the machine learning algorithm, an updated queue management setting based on the queue management setting and the performance metric 712

Apply one or more optimized queue management settings to the queue 714

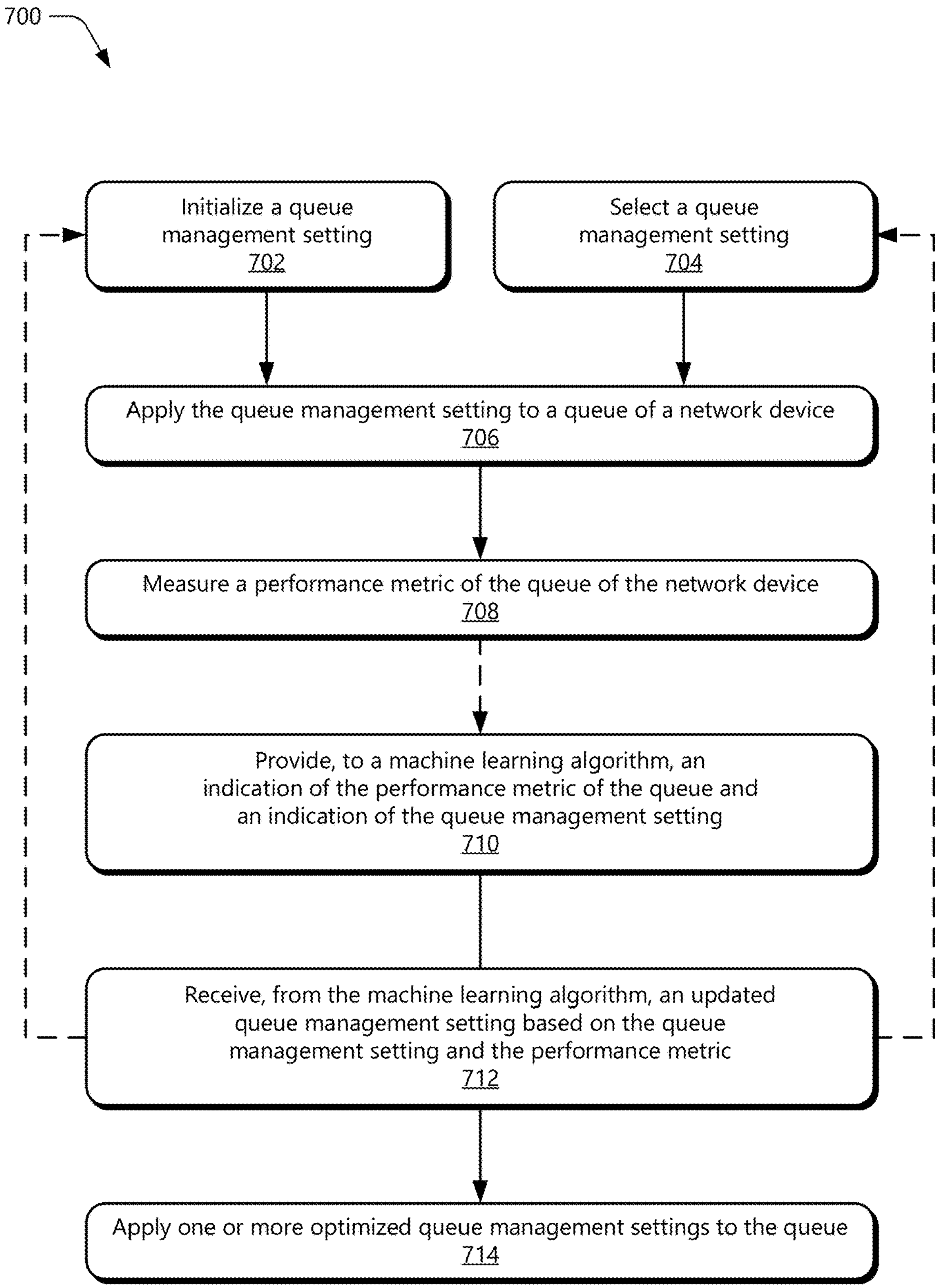

Fig. 7

Receive one or more performance thresholds for a queue of a network device
1102

Adjust a queue management setting of a network device with machine learning based on the one or more performance thresholds
1104

Monitor queue performance metrics while the network device operates with the adjusted queue management setting
1106

Compare the queue performance metrics with the one or more performance thresholds
1108

Apply the adjusted or optimized queue management settings to the queue of the network device
1110

Initiate readjustment of the queue management settings of the network device with machine learning in response to the performance metrics not exceeding the one or more performance thresholds
1112

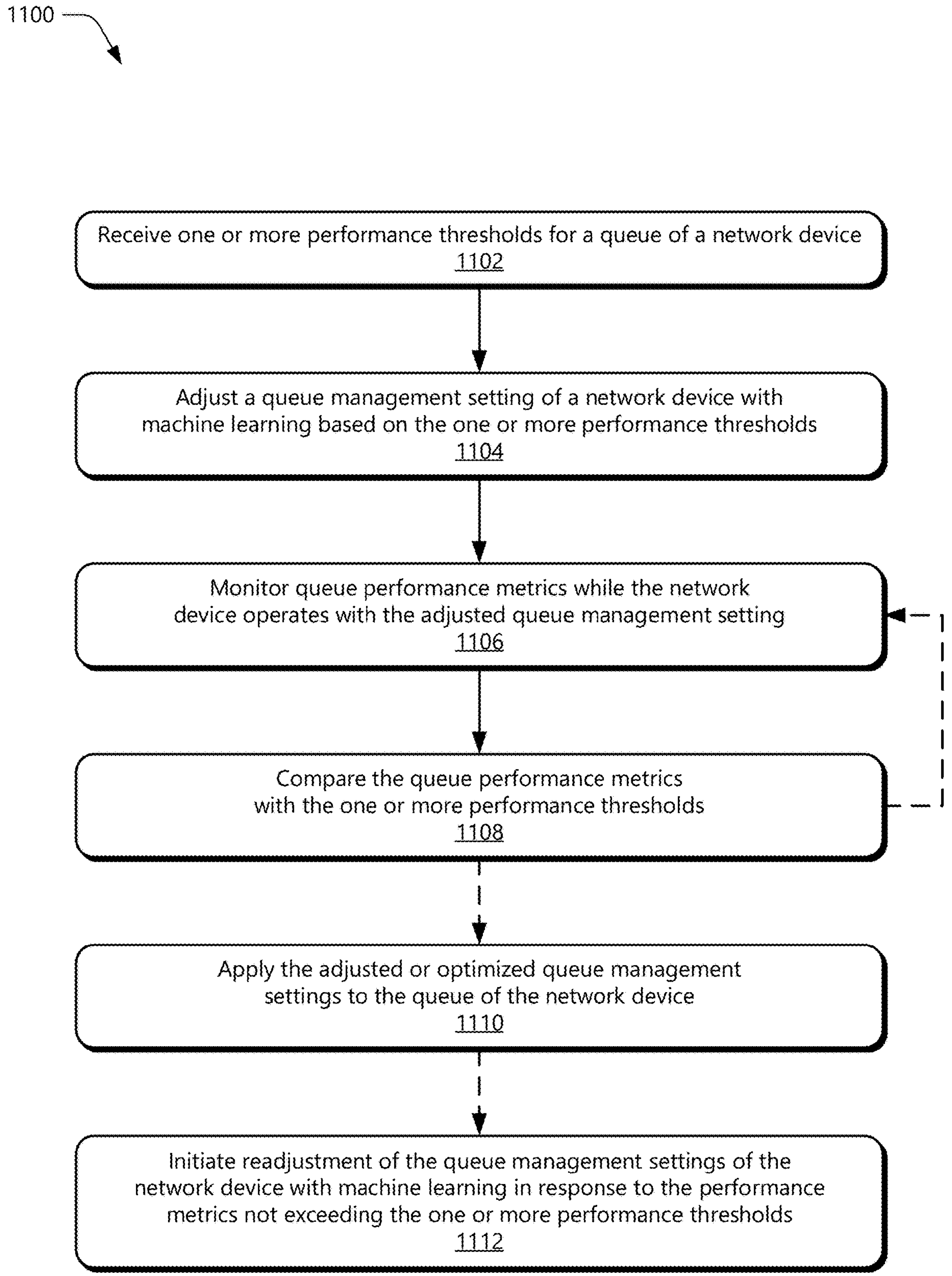

Fig. 11

MACHINE LEARNING-ENABLED QUEUE MANAGEMENT FOR NETWORK DEVICES

BACKGROUND

Data centers for cloud computing and other services typically include a large number of servers for communicating, storing, and processing vast amounts of data. The servers of a data center are organized into racks of servers and further into rows of server racks. To facilitate data communication among the servers, network switches are often deployed into the server racks (e.g., top of rack switches), as well as between the server racks and the rows of the server racks. As such, data traversing a network within the data center may travel through multiple layers of network switches between various stages of communication, storage, and processing.

Some data traffic flows, however, may cause congestion of the network when too much data is routed through one or a few network switches. Generally, these traffic flows can fill up or overload buffers of a network switch, which may prevent other linked data sources from sending additional data to that network switch. Thus, the congestion of one or few network switches can spread throughout the network, affecting performance of the data network and any of the servers attempting to send or receive data through the congested network switches. In some cases, the network switches are configured with congestion mitigation policies to reduce data traffic flow when a network switch becomes congested. These congestion mitigation policies, however, are typically configured for a default or an average type of data flow and are unable to address dynamic traffic flows or different network conditions that are common throughout many data centers. As such, the default congestion mitigation policy of the network switch devices often fails to address many congestion scenarios, which can result in increased latency, reduced throughput, and failure to initiate mitigation actions until buffers of the network switch are overloaded and back pressuring data traffic sources.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method for machine learning-enabled (ML-enabled) queue management for network devices includes initializing a queue management setting with a randomized value and applying the queue management setting to a queue of a network device. The network device then operates to process packets through the queue based on the queue management setting and a performance metric of the queue is measured for the packets processed through the queue based on the queue management setting. The method provides, to an ML algorithm, an indication of the queue management setting and an indication of the performance metric of the queue and receives, from the ML algorithm, an updated queue management setting based on the queue management setting and the performance metric of the queue. The updated queue management setting is then applied to configure one or more queues of the network device to process subsequent packets based on the updated queue management setting received from the ML algorithm. In various aspects, respective policies may be tuned for a specific queue or for a set of queues. By so doing, the method may tune one or more queue management settings of the queue to improve or optimize performance of the network device.

In other aspects, an apparatus includes a media access control layer configured to communicate packets through one or more network interfaces, multiple queues configured to buffer packets communicated through the one or more network interfaces, a switch controller configured to route the packets between the multiple queues, and an ML-enabled queue manager. The ML-enabled queue manager is associated with the multiple queues and an ML algorithm. The ML-enabled queue manager is configured to initialize a queue management setting for at least one of the multiple queues with a randomized value and enable the queue to process packets based on the queue management setting. The ML-enabled queue manager then measures a performance metric of the queue for the packets processed through the queue and provides, to the ML algorithm, an indication of the queue management setting and an indication of the performance metric of the queue. From the ML algorithm, the ML-enabled queue manager receives an updated queue management setting, which is applied to the queue effective to configure the queue of the apparatus to process subsequent packets based on the updated queue management setting received from the ML algorithm.

In yet other aspects, a system-on-chip (SoC) includes multiple queues configured to buffer packets communicated through network interfaces to which the SoC is operably coupled. The SoC also includes an ML-enabled queue manager that is associated with an ML algorithm, which may be implemented by the SoC or an ML engine of the SoC. The ML-enabled queue manager can be configured to initialize a queue management setting (e.g., packet marking threshold) for at least one of the multiple queues with a randomized value that is used by the queue to process packets received or transmitted by the SoC. The ML-enabled queue manager measures a performance metric of the queue for the packets processed and provides, to the ML algorithm, an indication of the queue management setting and an indication of the performance metric of the queue. The ML algorithm provides the ML-enabled queue manager with an updated queue management setting, which the ML-enabled queue manager applies to the queue to configure the queue of the SoC to process subsequent packets based on the updated queue management setting.

The details of one or more implementations are set forth in the accompanying drawings and the following description. Other features and advantages will be apparent from the description and drawings and from the claims.

BRIEF DESCRIPTION OF THE DRAWINGS

The details of one or more implementations of machine learning-enabled (ML-enabled) queue management for network devices are set forth in the accompanying figures and the detailed description below. In the figures, the left-most digit of a reference number identifies the figure in which the reference number first appears. The use of the same reference numbers in different instances in the description and the figures indicates like elements:

FIG. 7 depicts an example method for ML-enabled management of a network device queue in accordance with one or more aspects;

FIG. 11 depicts an example method for tuning queue management settings using a machine learning algorithm.

DETAILED DESCRIPTION

Figure 1:
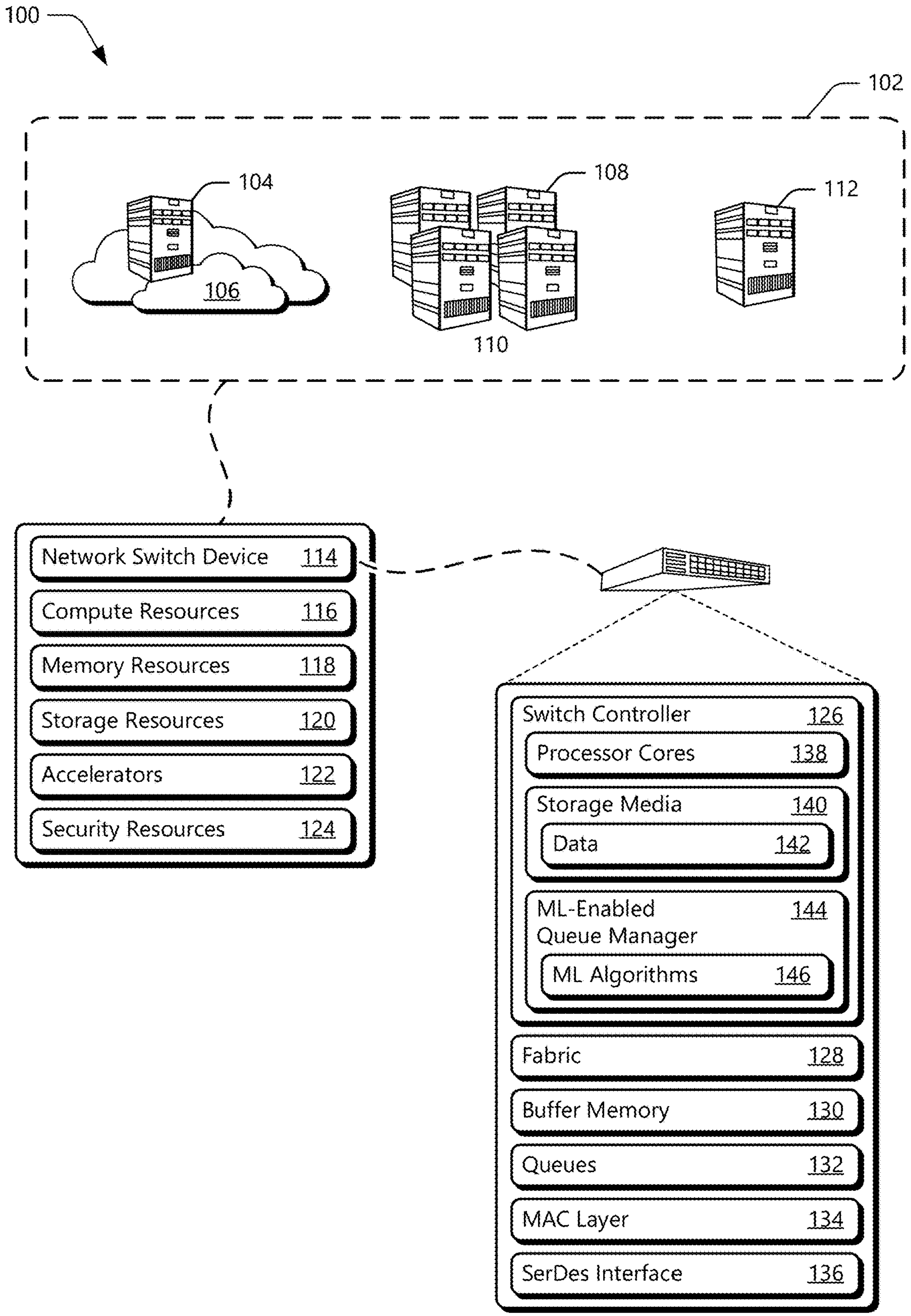
FIG. 1 illustrates an example operating environment having systems in which aspects of ML-enabled queue management for network devices can be implemented in accordance with one or more aspects.

Data centers for cloud computing and other services typically include a large number of servers for communicating, storing, and processing vast amounts of data. To facilitate data communication among the servers, network switches are often deployed into server racks (e.g., top of rack switches), as well as between the server racks and rows of the server racks. As such, data traversing a network within the data center may travel through multiple layers of network switches between various stages of communication, storage, and processing. Generally, traffic flows of data packets are dynamic throughout the network over time and types of traffic flows. These dynamic traffic flows can cause congestion of the network when too much data is routed through a small number of data paths or network switches. When the traffic flows fill up or overload buffers of a network switch, the network switch can be prevented from communicating additional data with other network switches of devices. In some cases, congestion of one or a few network switches can spread throughout the network, affecting performance of the data network and any of the servers attempting to send or receive data through the congested network switches.

To address congestion, the switch devices may implement congestion mitigation policies to reduce data traffic flow when a network switch becomes congested. Preceding congestion mitigation policies, however, are typically deployed with a default or an average type of data flow and are unable to address dynamic traffic flows or different network conditions that are common throughout many data centers. In some cases, network center operators employ highly skilled engineers to tune the congestion mitigation policies over many months, though for many data centers this solution is cost prohibitive and the benefits of tuning short-lived as traffic flow profiles quickly change. As such, default or manually tuned congestion mitigation policies of the network switch devices often fail to address many congestion scenarios, which can result in increased latency, reduced throughput, and failure to initiate mitigation actions until buffers of the network switch are overloaded and back pressuring data traffic sources.

This disclosure describes apparatuses and techniques for machine learning enabled (ML-enabled) queue management for network devices. In contrast with preceding techniques of congestion mitigation, the described apparatuses and techniques may implement ML-enabled management of network switch queues, including adjusting or tuning settings of queue management policies for mitigating queue congestion. In some aspects, an ML-enabled queue manager implements reinforcement learning to automatically tune settings of a queue management policy in a dynamic networking environment. Generally, the ML-enabled queue manager may implement episodes of machine learning in which queue management settings are learned through trial and error of settings adjustment. For an episode of machine learning, a setting may be initialized with a random value and iteratively updated as the ML-enabled queue manager collects statistics indicative of respective network responses to each of the setting adjustments. In some aspects, the ML-enabled queue manager may initialize queue settings (e.g., for an episode of ML) with a baseline starting point for general applications, and then fine-tune the settings for a particular implementation (e.g., a particular data center, network configuration, etc.). As the machine learning progresses, the ML-enabled queue manager can further adjust the setting toward an optimal value based on an observed system response and/or performance targets. The iterative adjustment of queue management settings may be balanced between exploration of learning system responses to different settings and exploitation in using optimal learned states to maximize performance.

In some aspects, the ML-enabled queue manager or ML algorithms may be configured for decaying exploration over time such that the ML algorithm trends toward settings for optimized performance of the network switch device. Further, the ML-enabled queue manager may automatically tune individual queues or subsets of queues of a network switch device, thereby providing a high level of tuning granularity across multiple data paths. As such, network switch devices with ML-enabled queue management deployed throughout a data network can automatically self-tune queue management settings in a fraction of the time (e.g., minutes) typically consumed for manual tuning (e.g., months) and provide optimized queue settings that reduce latency, increase throughput, and efficiently trigger congestion mitigation to minimize or prevent failover events.

In some aspects, an ML-enabled queue manager of a network switch device initializes a queue management setting with a randomized value and applies the queue management setting to a queue of the network switch device. The network device then operates to process packets through the queue based on the queue management setting, and the ML-enabled queue manager measures a performance metric of the queue for the packets processed through the queue based on the queue management setting. The ML-enabled queue manager then provides, to an ML algorithm, an indication of the queue management setting and an indication of the performance metric of the queue and receives, from the ML algorithm, an updated queue management setting based on the queue management setting and the performance metric of the queue. The ML-enabled queue manager applies the updated queue management setting to configure the queue of the network device to process subsequent packets based on the updated queue management setting received from the ML algorithm. By so doing, the ML-enabled queue manager can optimize one or more queue management settings of the queue to improve performance of the network device.

The following discussion describes an operating environment, configurations, techniques that may be employed in the operating environment, and a System-on-Chip (SoC) in which components of the operating environment may be embodied. In the context of the present disclosure, reference is made to the operating environment, techniques, or various components by way of example only.

Operating Environment

FIG. 1 illustrates an example operating environment 100 having computing systems 102 in which aspects of ML-enabled queue management may be implemented in accordance with one or more aspects. Generally, a computing system 102 of the operating environment 100 can communicate, store, or process various data, files, objects, or information. Examples of the computing system 102 may include a computing cluster 104 (e.g., of a cloud 106), a server 108 or server hardware of a data center 110, or a server 112 (e.g., standalone), any of which may be configured as part of a data center, server farm, or cloud system. Further examples of a computing system 102 (not shown) may include a network switch, network router, access point, tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, server blade, gaming console, automotive entertainment device, automotive computing system, automotive control module (e.g., engine or power train control module), and so on. Generally, the computing system 102 may communicate or store data for any suitable purpose, such as to enable functionalities of various applications (e.g., social media), enable services (e.g., search), store or host data, process data, enable network access, implement gaming platforms, stream media data, provide navigation information, host content creation or editing services, and the like.

In the context of a data center or server cluster, the computing system 102 may include a network switch device 114, compute resources 116, memory resources 118, and storage resources 120. In some cases, the computing system 102 includes accelerators 122 of various types (e.g., encryption hardware, graphics processing) or security resources 124 to protect the computing system 102 and data from malicious actors. Alternatively, a computing system 102 may be operably coupled with a network switch device 114, such as when a computing system is coupled to a data network through the network switch device. The compute resources 116 can include any suitable type or number of processors (e.g., x86 or ARM), either single-core or multi-core, for executing instructions or commands of an operating system, firmware, or other applications of the computing system 102.

The memory resources 118 are configured as computer-readable media (CRM) and include memory from which applications, services, virtual machines, tenants, or programs hosted by the computing system 102 are executed or implemented. The memory resources 118 of the computing system 102 may include any suitable type or combination of volatile memory or nonvolatile memory. For example, the memory resources 118 may include various types of random-access memory (RAM), dynamic RAM (DRAM), static RAM (SRAM), read-only memory (ROM), electronically erasable programmable ROM (EEPROM), or Flash memory (e.g., NOR Flash or NAND Flash). The storage resources 120 include non-volatile storage of the computing system 102, such as solid-state drives, optical media, hard disk drives, non-volatile memory express (NVMe) drives, peripheral component interconnect express (PCIe) drives, storage arrays, and so forth. The memory resources 118 and storage resources 120, individually or in combination, may store data associated with the various applications, tenants, workloads, initiators, virtual machines, and/or an operating system of the computing system 102.

In aspects, the computing system 102 includes or is coupled to the network switch device 114. For example, a server 112 configured within a rack may include a top-of-rack (TOR) network switch device 114 that enables communication between server components, other server racks, rows of servers, and so forth. Although shown as being combined with the computing system 102 in FIG. 1, the network switch device 114 may be implemented separately from or remotely from the computing system 102. Generally, the network switch device 114 enables data communication within the computing system 102 (e.g., between server blades) and/or enables the computing system 102 to communicate data with other computing systems or endpoints (e.g., between racks or rows). In this example, the network switch device 114 includes a switch controller 126, fabric 128, and a buffer memory 130, queues 132, a media access control (MAC) layer 134, and a serializer/deserializer (SerDes) interface 136. In other implementations, the network switch device may be configured differently, with fewer components or additional components (e.g., hardware accelerators), or with components combined.

The switch controller 126 may enable various functionalities of the network switch device 114, which include routing or transferring data packets from data sources to respective data destinations or endpoints. In other words, the switch controller 126 can manage or facilitate communication of data packets between resources of the computing system 102, other computing systems 102, or other network switch devices, examples of which are described herein. Generally, the network switch device 114 communicates data via network ports (e.g., wire or fiber ports) coupled to the SerDes interface 136 (and/or physical layer (PHY), not shown), which provides serializing and deserializing functions for data communicated over network connections. The MAC layer 134 provides an interface between the SerDes interface 136 and the queues 132 of the network switch device. In some implementations, the MAC layer 134 serializes and scrambles packetized data for transmission through the SerDes interface 136 or descrambles and packetizes data received through the SerDes interface 136.

The switch controller 126 can use the queues 132, buffer memory 130, or fabric 128 to transfer or route packets of data within the network switch device 114 by using address information or other data associated with the packets. In some implementations, the queues 132 may be associated with respective ports or transfer direction of the packets of data. For example, one of the queues 132 may be configured as an input queue of a network port (or interface) to buffer packets received through the network port and another one of the queues 132 can be configured as an output queue to buffer packets for transmission through the network port. As such, the switch controller 126 can transfer a packet of data or a flow of multiple data packets between different ports of the network switch device 114 using the fabric 128 to route the packets, the buffer memory 130 to organize the packets, and the queues 132 to store the packets after reception from or before transmission through lower layers of the network switch device 114.

In this example, the switch controller 126 includes processor cores 138 and storage media 140, which may store data 142 of the switch controller. In some cases, the data 142 includes configuration data and firmware for the switch controller 126, such as processor-executable instructions executed by the processor cores 138 to implement functionalities of the switch controller 126. In aspects, the switch controller 126 also includes an ML-enabled queue manager 144 that may be implemented to tune parameters or settings used by the queues 132 when processing packets of data received from a network port or buffered for transmission through the network port. For example, the ML-enabled queue manager 144 may implement a machine learning process to optimize parameters or settings of a queue management policy of an output queue (egress queue) of the network switch device 114. Thus, the aspects of ML-enabled queue management described herein may adjust thresholds and/or probabilities of policies implemented by the queue 132 or switch controller 126 to manage packet congestion of the queue. This is but one example of ML-enabled queue management, others of which are described throughout this disclosure.

Figure 2:
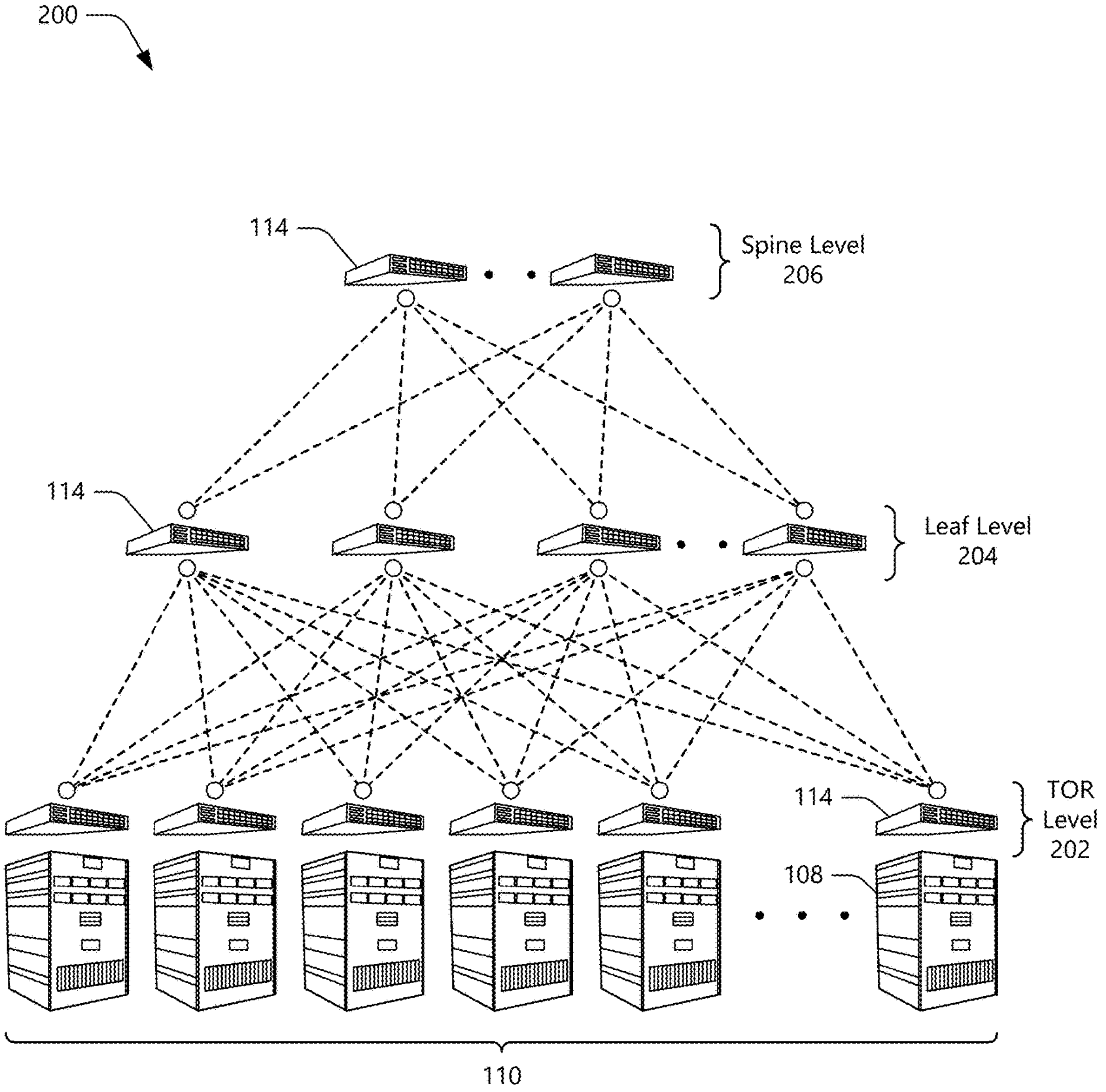
FIG. 2 illustrates an example networking environment in which network switch devices may implement aspects of ML-enabled queue management.

FIG. 2 illustrates at 200 an example networking environment in which network switch devices may implement aspects of ML-enabled queue management. In this example, multiple servers 108 are shown in the context of a data center 110 in which the servers 108 may communicate with other servers, other server rows, other data centers, and so forth. Generally, network switch devices 114 are implemented or deployed throughout the data center 110, such as at a top-of-rack (TOR) level 202 for a server 108, a leaf level 204 that connects multiple servers 108 or other devices, and a spine level 206 to provide a core network for the data center 110. As such, a network switch device 114 may see varying types and volumes of packet traffic depending on where the device is deployed within the data center 110. Further, packet traffic types and flows may also differ on a per-server basis, as respective hardware and software configurations may vary between the servers. In aspects of ML-enabled queue management for network devices, queue management settings may be selectively tuned or optimized on a per-device basis, such that network switch devices 114 at the TOR level 202, leaf level 204, and spine level 206 implement queue management polices with different settings or configurations. In other words, ML-enabled queue management techniques can be implemented throughout the data center 110 to optimize queue management for packets communicated through and across different networking levels and device types.

Figure 3:
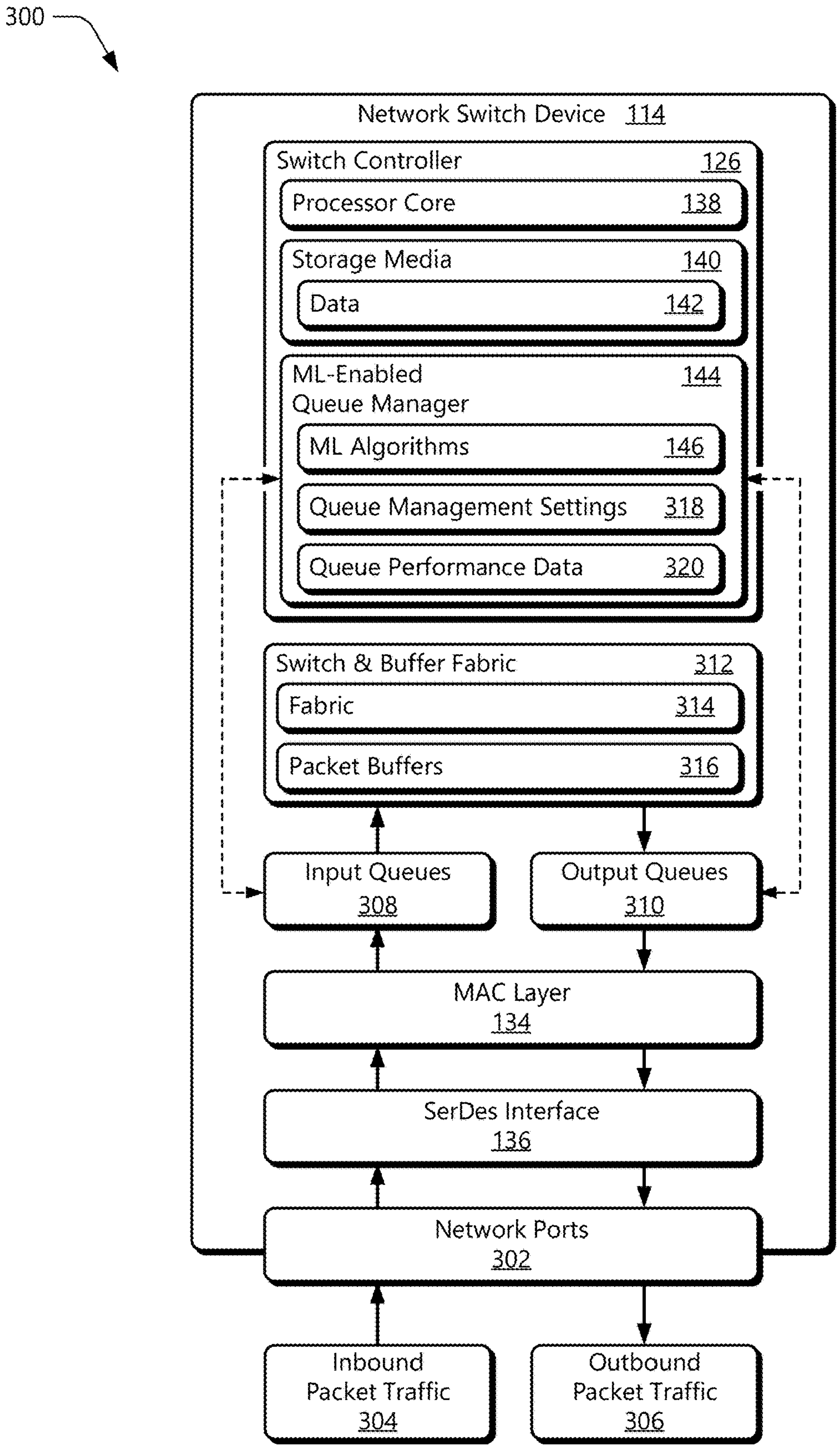
FIG. 3 illustrates an example configuration of a network switch device implemented with an ML-enabled queue manager in accordance with one or more aspects.

FIG. 3 illustrates at 300 an example configuration of a network switch device implemented with an ML-enabled queue manager in accordance with various aspects. The network switch device 114 described with reference to FIG. 3 may be configured similarly to or differently from the network switch device 114 of FIG. 1 or others described herein. Thus, the network switch device 114 may be configured with any suitable combination or organization of components described throughout the disclosure to implement aspects of ML-enabled queue management. Based on configurations of an ML-enabled queue manager 144 or respective components shown, the network switch device 114 may route, transfer, or process packets of data through one or more queues with respective policy settings configured using aspects of ML-enabled queue management, some examples of which are described with reference to FIG. 3 and throughout this disclosure.

As shown in FIG. 3, the network switch device includes network ports 302 through which the device communicates inbound packet traffic 304 and outbound data traffic 306. The packet traffic may traverse the SerDes interface 136 and MAC layer 134 for routing or switching of packets within the network switch device 114, such as described with reference to FIG. 1. In this example, the network switch device 114 includes input queues 308 and output queues 310, which may be selected or configured from a set or pool of available queues 132 (not shown). In some cases, the input queues 308 may be referred to as ingress queues for buffering packets received by the network switch device and the output queues 310 may be referred to as egress queues for buffering packets staged for transmission by the network switch device.

The network switch device 114 can also include a switch and buffer fabric 312 with a fabric 314 and packet buffers 316 that are coupled with the input queues 308 and output queues 310. Generally, a switch controller 126 can use the switch and buffer fabric 312 to transfer, route, or switch packets between data paths formed by the queues and network ports 302 of the network switch device 114. Thus, to route data packets to an endpoint, the switch controller 126 sends those data packets to one of the output queues 310 associated with a network port 302 through which the data packets can be transferred to the endpoint. Alternatively, the network switch device 114 may receive data packets from a source through one of the input queues 308 associated with a network port 302 to which the source is coupled. As such, traffic of data packets through the input queues 308 and output queues 310 of the network switch device 114 may be determined primarily based on respective sources and destinations of the packets.

Generally, optimal queue performance may be characterized by a shallow depth or low queue length as packets are buffered and move through a given queue, which may correspond to low latency and high throughput for packet traffic because the queue remains less than full and avoids becoming congested. To manage data traffic flow through a queue 132 or the length of the queue, the switch controller 126 and/or queues 132 may implement active queue management (queue management) that acts to reduce traffic flow into the queue to mitigate congestion as the queue approaches maximum capacity. As described herein, the ML-enabled queue manager 144 can implement machine learning to initialize, adjust, or tune one or more settings of queue management to optimize when or to what degree a queue management policy acts to regulate a flow of data packets through a queue 132 of the network switch device 114. As shown in FIG. 3, the ML-enabled queue manager 144 includes one or more ML algorithms 146, queue management settings 318 (settings 318), and queue performance data 320 (performance data 320) to implement various techniques of ML-enabled queue management. In aspects, the ML-enabled queue manager interacts with the input queues 308 or output queues 310 to adjust the settings 318 and/or measure the performance data 320. For example, the ML-enabled queue manager 144 may initialize a setting 318 with a random value and iteratively update the setting as the ML-enabled queue manager 144 measures performance data 320 (e.g., metrics or statistics) indicative of respective network responses to each of the setting adjustments. As the machine learning progresses through iterations, the ML-enabled queue manager 144 can further adjust the setting toward an optimal value based on the observed performance data or performance targets. The iterative adjustment of the queue management settings 318 by the ML-enabled queue manager 144 may be balanced between exploration of learning system responses to different settings and exploitation in using optimal learned states to maximize performance.

Various aspects of ML-enabled queue management may be implemented by the ML-enabled queue manager 144, which can interact with the ML algorithms 146 or any suitable neural network, artificial intelligence (AI) engine, AI model, or AI driver of or associated with a network switch device 114, the switch controller 126, or a queue management component. With respect to adjusting or tuning queue management settings, one or more of the ML algorithms 146 may be used to implement the aspects or techniques described herein, such as adjusting or tuning a minimum threshold, maximum threshold, or maximum probability of a queue management policy (e.g., WRED or ECN). In aspects, the thresholds correspond to a minimum threshold at which the probability for action (e.g., packet marking or packet dropping) by a given policy is a minimum value and/or a maximum threshold at which the probability for action is a maximum value. Alternatively or additionally, the ML-enable queue manager 144 can define or set a slope of a line and intercepts with a minimum value (e.g., 0) and a maximum probability. In yet other cases, the ML-enable queue manager 144 can define or set a non-linear curve, such as a piece-wise curve for which the manager can set one or more segments (e.g., segments between a minimum threshold and maximum threshold of different respective slope). The ML-enabled queue manager 144 may implement any suitable ML algorithm 146, such as a state-action-reward-action-state (SARSA) algorithm, a Q-learning algorithm, a temporal difference (TD) learning algorithm, a TD lambda algorithm, or the like. Alternatively or additionally, the ML-enabled queue manager 144 may implement a neural network or AI model that includes a group of connected nodes, such as neurons or perceptrons, which are organized into one or more layers.

In aspects, an instance of a neural network associated with the ML-enabled queue manager 144 may be implemented with a deep neural network (DNN) that includes an input layer, an output layer, and one or more hidden intermediate layers positioned between the input layer, a pre-input layer (e.g., embedding and/or averaging network), and the output layer of the neural network. Each node of the deep neural network may in turn be fully connected or partially connected between the layers of the neural network. A neural network may be any deep neural network (DNN), such as a convolutional neural network (CNN) including one of AlexNet, ResNet, GoogleNet, MobileNet, or the like. Alternatively or additionally, a neural network may include any suitable recurrent neural network (RNN) or any variation thereof. Generally, a neural network, ML algorithm, or AI model employed by the ML-enabled queue manager 144 may also include any other supervised learning, unsupervised learning, reinforcement learning algorithm, or the like.

In various aspects, a neural network of the ML-enabled queue manager 144 may be implemented as a recurrent neural network with connections between nodes forming a cycle to retain information from a previous portion of an input data sequence for a subsequent portion of the input data sequence (e.g., queue management settings, adjustments to the settings, queue performance statistics, etc). Alternately, a neural network may be implemented as a feed-forward neural network having connections between the nodes that do not form a cycle between input data sequences. In yet other cases, a neural network of the ML-enabled queue manager 144 may include a CNN with multilayer perceptrons where each neuron in a given layer is connected with all neurons of an adjacent layer. In some aspects, the neural network is based on a CNN that may be applied to previous media health scoring to predict or forecast some form of subsequent or future condition of a network environment in which the network switch device is deployed. Alternately or additionally, the ML algorithms or neural networks employed by the ML-enabled queue manager 144 may include or utilize various regression models, such as multiple linear regression models, a single linear regression model, logistical regression models, stepwise regression models, multi-variate adaptive regression models, locally estimated scatterplot models, or the like. The ways in which the ML-enabled queue manager 144 and ML algorithms 146 can be implemented and used vary and are described throughout this disclosure.

Figure 4:
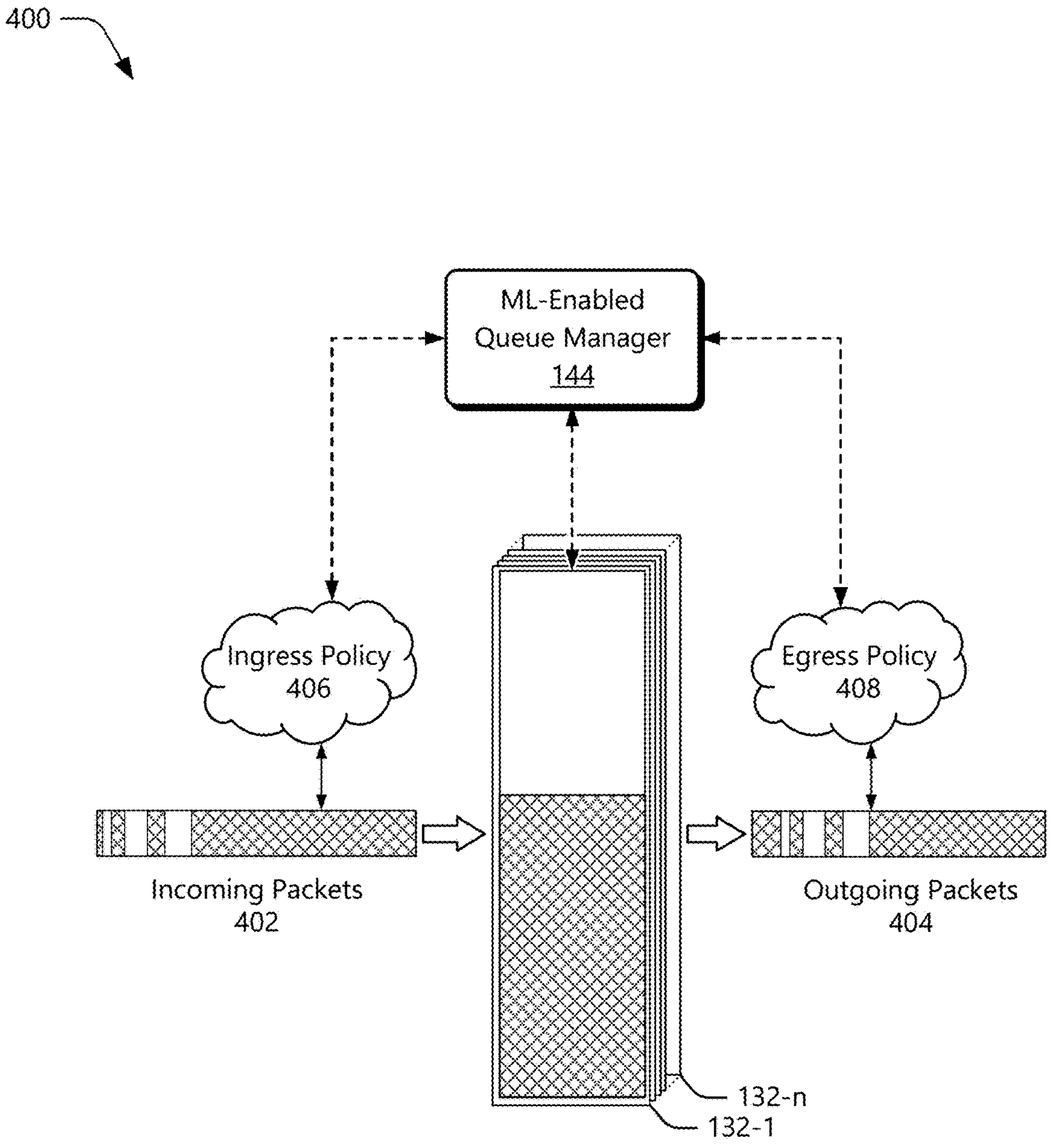
FIG. 4 illustrates an example of a queue configured in accordance with various aspects of ML-enabled queue management.

FIG. 4 illustrates at 400 an example of a queue configured in accordance with various aspects of ML-enabled queue management. The queue 132 may represent any type of queue or buffer of a network switch device, which may include an ingress queue, input queue, egress queue, output queue, packet buffer, or the like. In this example, multiple queues 132-1 through **132-*n* are shown, where n is any suitable integer and the queues may be configured similarly to or differently from one another. For example, the queues may be configured as any type of queue or buffer, such as first-in, first out (FIFO), last-in, first-out (LIFO), circular, re-order, or the like. In various aspects, packet scheduling may be performed or implemented across ports of queues of a network switch device according to a scheduling policy or discipline. For example, ports may be scheduled proportional to respective speeds of the ports, whereas queues may be scheduled with a per queue scheduling discipline such as Strict Priority, Weighted Deficit Round Robin, Weighted Round Robin, Weighted Fair Queuing, or the like. Generally, a queue 132 (e.g., egress queue) can be configured to buffer and hold incoming packets 402 received from a packet source (e.g., switch and buffer fabric) and release outgoing packets 404** to a packet destination (e.g., MAC layer or network port) when the destination is ready to receive or process the packets.

In aspects, the queue 132 is configured with an ingress queue management policy 406 (ingress policy 406) or egress queue management policy 408 (egress policy) by which queue activity can be managed. To implement ML-enabled queue management, the ML-enabled queue manager 144 may interact with the ingress policy 406, egress policy 408, or the queue 132 to manage queue settings 318 and/or obtain performance data 320 associated with the queue. Although described with reference to packet direction relative to the queue 132, the queue management policies or configurations may be applied to either incoming packets 402 or outgoing packets 404 and may be implemented individually or in combination depending on queue management settings 318 of a queue.

In some implementations, the ingress policy 406 includes a packet drop policy, such as a weighted random early detection (WRED) policy that operates by probabilistically dropping packets based on settings 318 of the policy. For example, the settings 318 for the WRED policy may include a minimum threshold (e.g., $\mathrm{Min}_{TH}$) for dropping packets, a maximum threshold (e.g., $\mathrm{Max}_{TH}$) for dropping packets, or maximum probability (e.g., $\mathrm{Max}_{P}$) for dropping packets, which are described herein. An egress policy 408 may include a packet marking policy, such as an explicit congestion notification (ECN) policy that operates by probabilistically marking outgoing packets 404 based on settings 318 of the policy. For example, the settings 318 of the ECN policy may include a minimum threshold for marking packets, a maximum threshold for marking packets, or maximum probability threshold for marking packets. Alternatively or additionally, management of the queue 132 may include a priority flow control (PFC) protocol that supports lossless transmission by managing packet traffic flows when congestion events occur. In other words, the queue 132 may implement the PFC policy to pause and resume communication between two network nodes to prevent the queue 132 from backing up and trigger a pause in queue traffic/PFC to prevent loss due to resource (buffer, queue, partition, etc.) exhaustion/overflow. The settings 318 of the PFC policy may include one or more thresholds for initiating PFC events, which may include pausing and/or resuming packet traffic with linked peers that are communicating with the network switch device via ports associated with the queue 132.

In aspects, the ML-enabled queue manager 144 can adjust the settings 318 of the various queue management policies implemented for queues 132 of the network switch device 114 to alter operating characteristics of the queues 132 and thus the network switch device. As part of the machine learning described herein, the ML-enabled queue manager 144 also obtains or receives performance data 320 for the queue 132, either from the queues, the management policies (e.g., metrics), the switch controller 126, or the like. For example, the ML-enabled queue manager 144 may interact with the switch controller 126 to obtain one or more queue performance metrics, which may include a utilization rate for a network port associated with the queue, a utilization rate for the queue, an average occupancy of the queue, an average queue length, a duration of one or more priority flow control events initiated by the queue, a duration and/or number of PFC events, a number of packets dropped by the queue, a number of packets marked by the queue, or the like. In some cases, the ML-enabled queue manager 144 processes the performance metrics received from the switch controller 126 or queue 132 to obtain performance data 320 for a duration of time for which the ML-enabled queue manager 144 implements a step or episode of machine learning. In other words, the ML-enabled queue manager 144 may determine a time duration of a machine learning operation and query the switch controller for queue performance metrics for that duration of time to generate the performance data 320.

Figure 5:
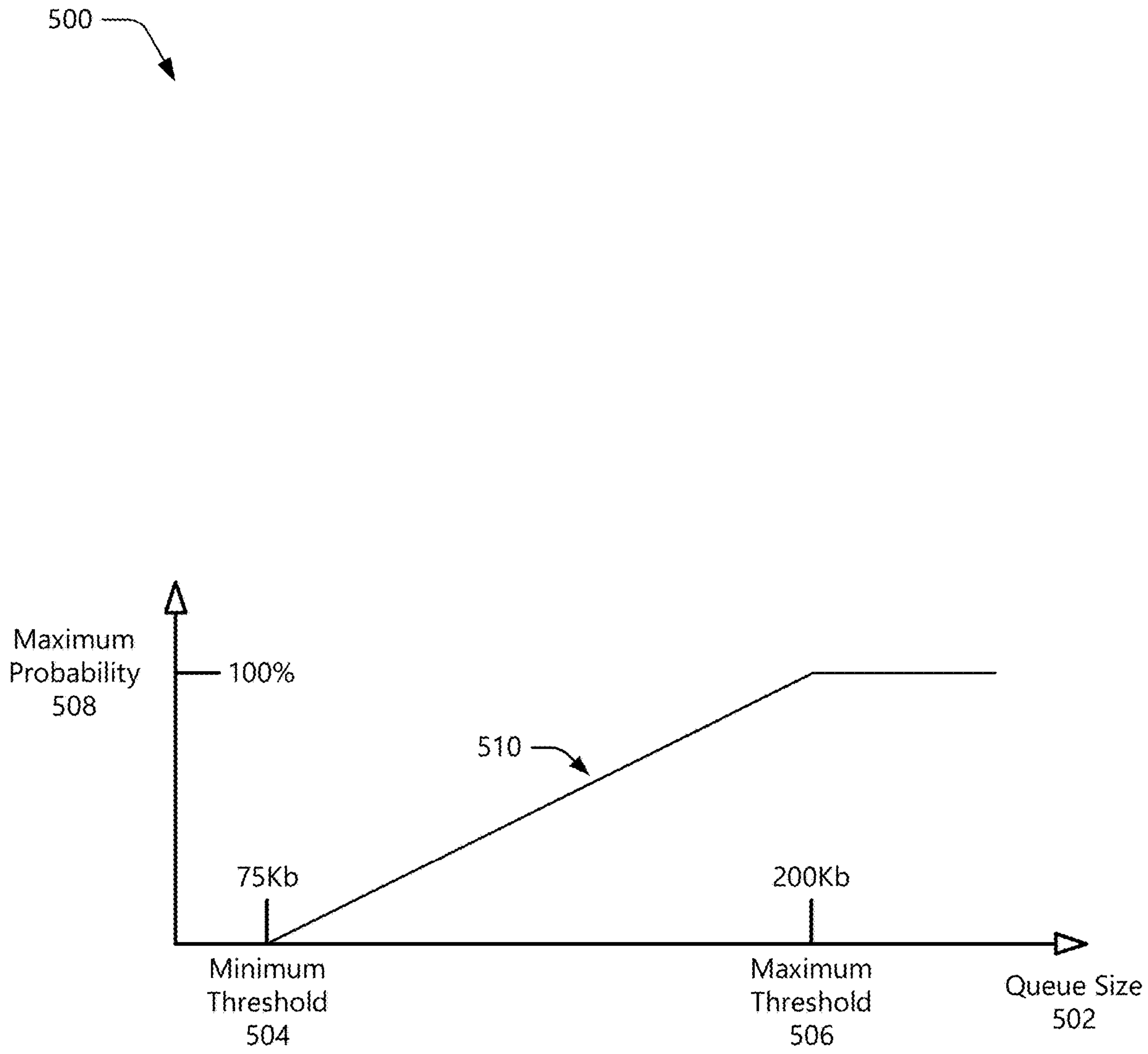
FIG. 5 illustrates a graph of an example queue management curve and settings that may be configured through aspects of ML-enabled queue management.

As an example of queue management settings, consider FIG. 5 which illustrates at 500 a graph of a queue management curve and settings that may be configured through aspects of ML-enabled queue management. In aspects, a setting for queue management may include a threshold for a queue (or controller) to trigger a priority flow control event (e.g., back pressuring), a threshold for the queue to trigger a packet drop policy (e.g., probabilistic packet dropping), or a threshold for the queue to trigger a packet marking policy (e.g., probabilistic packet marking). In the context of queue size 502, a set of settings 318 may include a minimum threshold 504 at which a queue management function initiates, a maximum threshold 506 at which the queue management function reaches maximum application, and a maximum probability 508 that defines a probabilistic maximum applied at the maximum threshold.

Generally, these queue management settings 318 may define a queue management line or queue management curve 510 that governs when and how queue management actions are performed. In this example, the minimum threshold 504 is set for 75 Kilobits (Kb), the maximum threshold 506 is set for 200 Kb, and the maximum probability 508 is set at 100%. In some cases, such as for priority flow control or other lossless data policies, the settings 318 may include a single threshold value for implementing priority flow control. Alternatively or additionally, the settings 318 may include one or more other settings (e.g., 10-15% lower than initiating thresholds) for when to cease queue management activities, which may include ceasing to drop packets, ceasing to mark packets, or ceasing priority flow control. In aspects, the ML-enabled queue manager 144 can adjust the settings 318 of the various queue management policies to alter performance of the queue during the machine learning process, which may lead to the determination of improved or optimized settings for dynamic network environments (e.g., to minimize or reduce a number and/or duration of PFC events).

Figure 6:
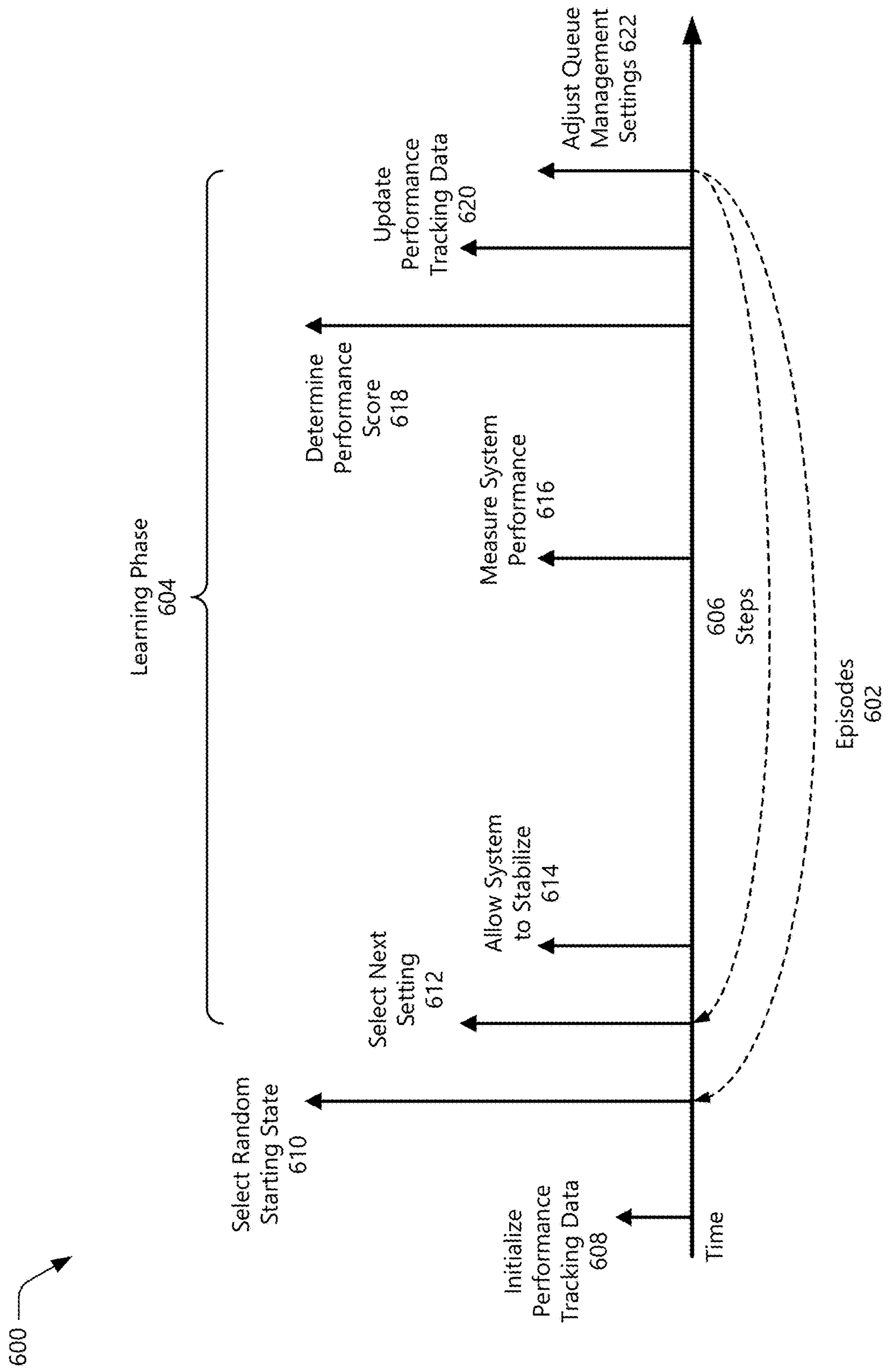
FIG. 6 illustrates a graph of example machine learning operations that may be implemented for optimizing queue management settings.

FIG. 6 illustrates at 600 a graph of example machine learning operations that may be implemented for optimizing queue management settings. Generally, the ML-enabled queue manager 144 may use machine learning algorithms or artificial intelligence models to adjust queue management settings 318 for varying network topologies and traffic flows. In various aspects, the ML-enabled queue manager 144 implements reinforcement learning to automatically tune settings of a queue management policy (e.g., WRED, ECN, PFC) in a dynamic networking environment. To do so, the ML-enabled queue manager 144 may implement episodes of machine learning in which queue management settings 318 are learned through trial and error of settings adjustment or tuning.

As shown in FIG. 6, the ML-enabled queue manager 144 may implement aspects of machine learning for adjusting queue management settings or parameters. Illustrated in relation to time in this example, the machine learning process may include multiple episodes 602 (e.g., m number of episodes) that include a learning phase 604 of multiple steps (e.g., n number of steps). In aspects, an episode 602 may be implemented for adjusting one queue management setting for which multiple steps 606 are performed to vary the setting and measure a response of the network based on changes or tuning of the setting. Before starting an episode 602, the ML-enabled queue manager 144 can initialize performance tracking data at 608 (e.g., performance data 320) and select a random starting state of one or more settings 318 by which to initiate an episode 602 of machine learning. For example, the ML-enabled queue manager 144 can initialize multiple settings 318 with randomized values before starting an episode 602 of multiple steps 606. When not starting from randomized starting state, the learning phase 604 or steps 606 may select a next queue management setting at 612 based on previous or accumulated performance data of previous steps. In some aspects, based on desired training time, deployment type (e.g., a real network, network initialization, or test-bed), the ML-enabled queue manager 144 may start performance tracking data from different points. For example, a real deployment without training in test-bed may start from a known good base (e.g., baseline data), with minimal exploration allowed (e.g. perform only small, slow optimizations from the baseline).

After the settings 318 are initialized or selected, the learning phase 604 allows a network switch device to operate, including a duration of time for which the system is allowed to stabilize at 614. The ML-enabled queue manager 144 may then measure system performance at 616, which may include port/queue utilization, average queue size or length, duration of PFC events, number of packets marked, number of packet dropped, or the like. At 618, the ML-enabled queue manager 144 can determine a performance score using the system performance data 320, which may include mapping the performance data to a performance score using a performance scoring table. This mapping may include quantizing performance statistics, such as from large values (e.g., 20-bit to 30-bit values) down to 4-bit to 8-bit values and concatenating quantized bit values to generate the performance score. In other words, the ML-enabled queue manager 144 may determine the performance score by mapping the large data values of the performance statistics to a smaller space (e.g., a constrained space) through a non-liner mapping to a single value. The ML-enabled queue manager 144 can then update the tracking data at 620 with the performance score from 618 and adjust the queue management settings at 622 using the updated performance score or accumulated performance scores for the queue management settings. As the machine learning progresses, the ML-enabled queue manager 144 can further adjust the setting toward an optimal value based on an observed system response and/or performance targets as reflected by the performance tracking data. The iterative adjustment of queue management settings may be balanced between exploration of learning system responses to different settings and exploitation in using optimal learned states to maximize performance.

Techniques for ML-Enabled Queue Management

The following discussion describes techniques for ML-enabled queue management for network devices in accordance with one or more aspects. These techniques may be implemented using any of the environments and entities described herein, such as the network switch device 114, queues 132, ML-enabled queue manager 144, and/or ML algorithms 146. These techniques include various methods illustrated in FIG. 7, FIG. 8, and FIG. 11, each of which is shown as a set of operations that may be performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement ML-enabled tuning of queue management settings to optimize packet traffic through a network switch device, which may reduce packet delay, increase packet throughput, and trigger traffic reduction measures to clear queue congestion. In portions of the following discussion, reference will be made to the operating environment 100 of FIG. 1 and various entities or configurations of FIGS. 2-6, FIG. 9, and/or FIG. 10 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the SoC of FIG. 12.

FIG. 7 depicts an example method 700 for ML-enabled management of a network device queue in accordance with one or more aspects. The operations of the method 700 may be implemented by a switch controller 126, queues 132, an ML-enabled queue manager 144, or an ML algorithm 146 of a network switch device 114.

At 702, an ML-enabled queue manager initializes a queue management setting for a queue of a network device. The queue management setting may be initialized with a default or randomized value. In some cases, the ML-enabled queue manager initializes a set or group of queue management settings of a queue management policy or protocol. For example, the queue management setting may include one or more thresholds for the queue to trigger a priority flow control event, a threshold for the queue to trigger a packet drop policy, a threshold for the queue to trigger a packet marking policy. Further, the queue management settings may include, for each type of queue management policy, a minimum threshold for implementing queue mitigation actions, a maximum threshold for implementing the queue mitigation actions, or a maximum probability at which the queue mitigation actions are implemented.

Optionally at 704, the ML-enabled queue manager selects a queue management setting. In some cases, the ML-enabled queue manager may select a queue management setting from an updated setting value determined from a previous step or episode of machine learning. As such, the queue management settings may include a set of randomized settings and at least one setting selected based on a learned or exploratory setting value.

At 706, the ML-enabled queue manager applies the queue management setting to a queue of a network device. For example, the ML-enabled queue manager may apply the setting to a queue management policy or flow control protocol of the queue to configure the queue to implement queue congestion mitigation or flow control based on the queue management setting. For example, the ML-enabled queue manager may set a threshold of an ECN policy, WRED policy, or PFC policy of the queue (e.g., configuring the policy based on/to respond to how often PFC/PAUSE is issued as part of the tuning process (when PFC/PAUSE is enabled)).

At 708, the ML-enabled queue manager measures a performance metric of the queue of the network device. In some implementations, the ML-enabled queue manager waits for an amount of time while packet traffic through the network device settles or stabilizes. The performance metric of the queue can be measured for a predefined amount of time (e.g., from one millisecond to ten milliseconds) or based on round-trip times (RTTs) of packets traveling through the network. In some cases, the ML-enabled queue manager may allow the packet switching system of the network device to settle for a first number of RTTs (e.g., while the system settles) and then measure performance for a second number of RTTs (e.g., while the system operates at steady state). The performance metrics of the queue may include one or more of a utilization rate for a port associated with the queue, a utilization rate for the queue, an average occupancy of the queue, or the like. Alternatively or additionally, the performance metric may relate to a queue management policy or protocol, such as a number and/or duration of one or more priority flow control events initiated by the queue based on the queue management setting, a number of packets dropped by the queue based on the queue management setting and in accordance with the packet drop policy, or a number of packets marked based on the queue management setting and in accordance with the packet marking policy.

At 710, the ML-enabled queue manager provides, to a machine learning algorithm, an indication of the performance metric of the queue and an indication of the queue management setting. In some cases, the ML-enabled queue manager provides an indication of an action taken from a previous setting value and an indication of the performance change or delta associated with the action. Various examples of actions taken with respect to the queue management parameter include increasing a minimum policy threshold (e.g., $\text{Min}_{TH}$), decreasing the minimum policy threshold, increasing a maximum policy threshold (e.g., $\text{Max}_{TH}$), decreasing the maximum policy threshold, increasing a maximum probability (e.g., $\text{Max}_P$), or decreasing the maximum threshold. The maximum learning algorithm may include any suitable type of algorithm, such as a state-action-reward-action-state (SARSA) algorithm, a Q-learning algorithm, a TD learning algorithm, a TD lambda algorithm, and so forth. In aspects, the ML-enabled queue manager can configure a reward system of the machine learning algorithm to drive queue management settings toward maximizing throughput of the queue, minimizing latency of the queue, and/or minimizing a length or depth of the queue processing packets of the network device.

In some aspects, the ML-enabled queue manager determines a score for the queue management setting based on the performance metric of the queue and provides the score to the machine learning algorithm. For example, the ML-enabled queue manager can quantize the performance metric of the queue and concatenate the performance metric of the queue with at least one other score for another performance metric of the queue (e.g., another quantized metric). Alternatively or additionally, a score entry of a performance tracking table that is indexed to the action or value of the queue management setting can be updated based on the concatenated score value of multiple quantized metrics to provide a non-linear mapping of the performance metrics (e.g., performance statistics) to a single value or update of the score entry.

At 712, the ML-enabled queue manager receives, from the machine learning algorithm, an updated queue management setting based on the queue management setting and the performance metric. In some cases, the machine learning algorithm is configured to provide an updated queue management setting based on a previous or accumulated value of the queue management setting, the performance metric (or score), and estimated future value. Thus, in some aspects, the ML-enabled queue manager obtains, from the machine learning algorithm, the updated queue management setting based at least in part on the score entry in the performance tracking table that is updated in operation 710.

From operation 712, the method 700 may return to operation 704 to use the updated queue management setting as the selected queue management setting for another iteration of operations 706 through 712, which may constitute a step of a machine learning process to optimize the queue management settings for the queue of the network switch. Alternatively, the method 700 may return to operation 702 to reinitialize the queue management setting or initialize another one of the queue management settings for another iteration of operations 706 through 712, which may constitute an episode of the machine learning process to optimize the queue management settings for the queue of the network switch.

In some cases, the ML-enabled queue manager determines whether to implement another episode or another step of the machine learning algorithm based on a randomized value, or a greedy sigma exploration policy. In other words, the ML-enabled queue manager may determine, based on randomize value and exploration threshold, to obtain another updated queue management setting from the machine learning algorithm or to initialize the queue management setting with another randomized value (or a known value, baseline value, randomize value selected from a range of baseline values) to obtain other performance metrics. The exploration threshold can be reduced over time effective to increase a likelihood of obtaining optimized/learned queue management settings from the machine learning algorithm to increase or maximize performance (with less exploration of different settings). After improved or optimized queue management settings are obtained, the method may proceed to 714.

At 714, the ML-enabled queue manager applies one or more optimized queue management settings to the queue of the network device. For example, the method 700 may implement several iterations of operations 706 through 712 as steps or episodes of a machine learning process until the performance metrics or scores for the queue management settings exceed a performance threshold for queue performance, which may include a latency, throughput, or flow control performance threshold for the queue. Alternatively, the machine learning process of queue management setting optimization may continue for a predefined or randomized amount of time or number of episodes of the machine learning process implemented by the ML-enabled queue manager.

Figure 8:
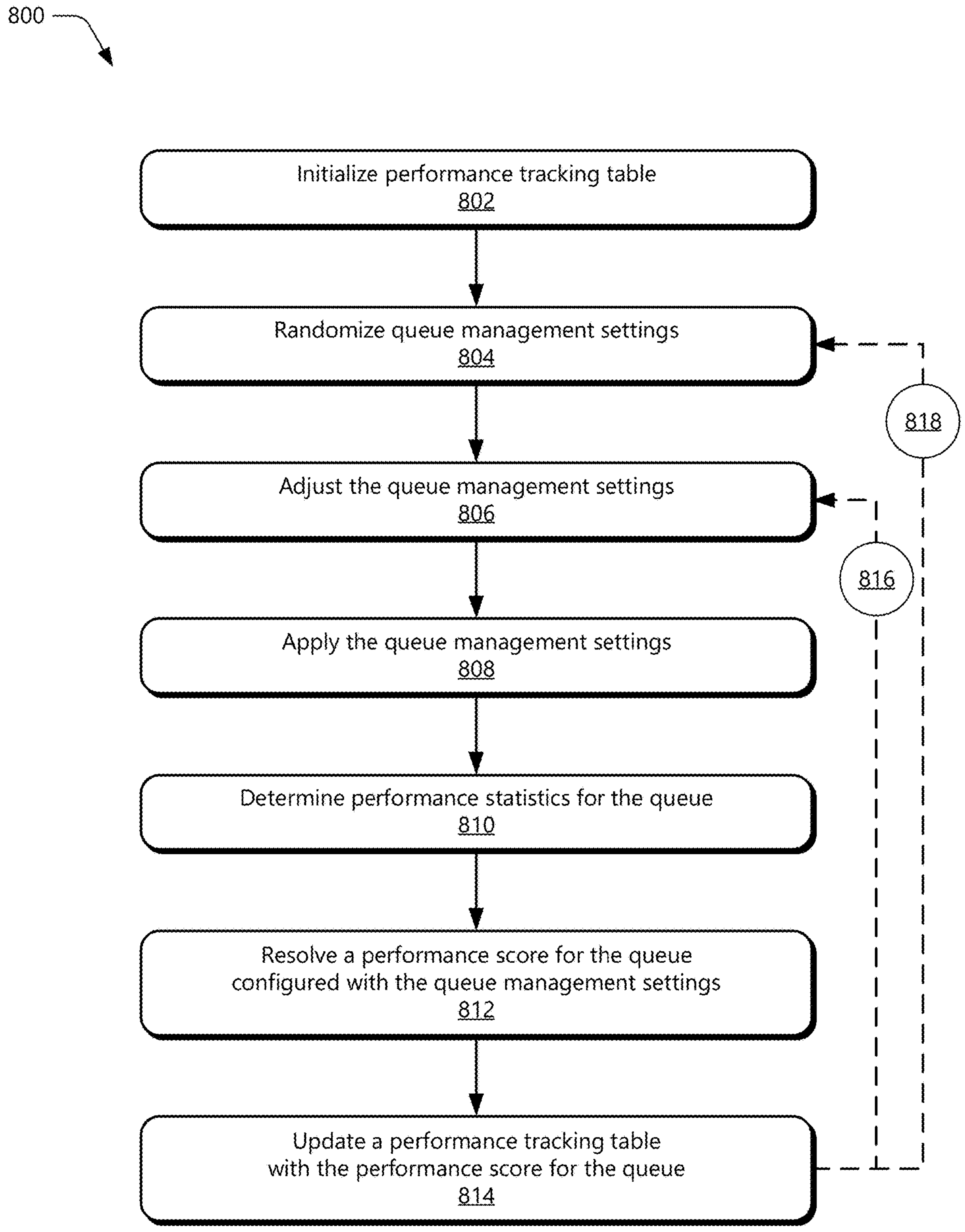
FIG. 8 depicts an example method for configuring queue management settings with machine learning in accordance with one or more aspects.
Figure 9:
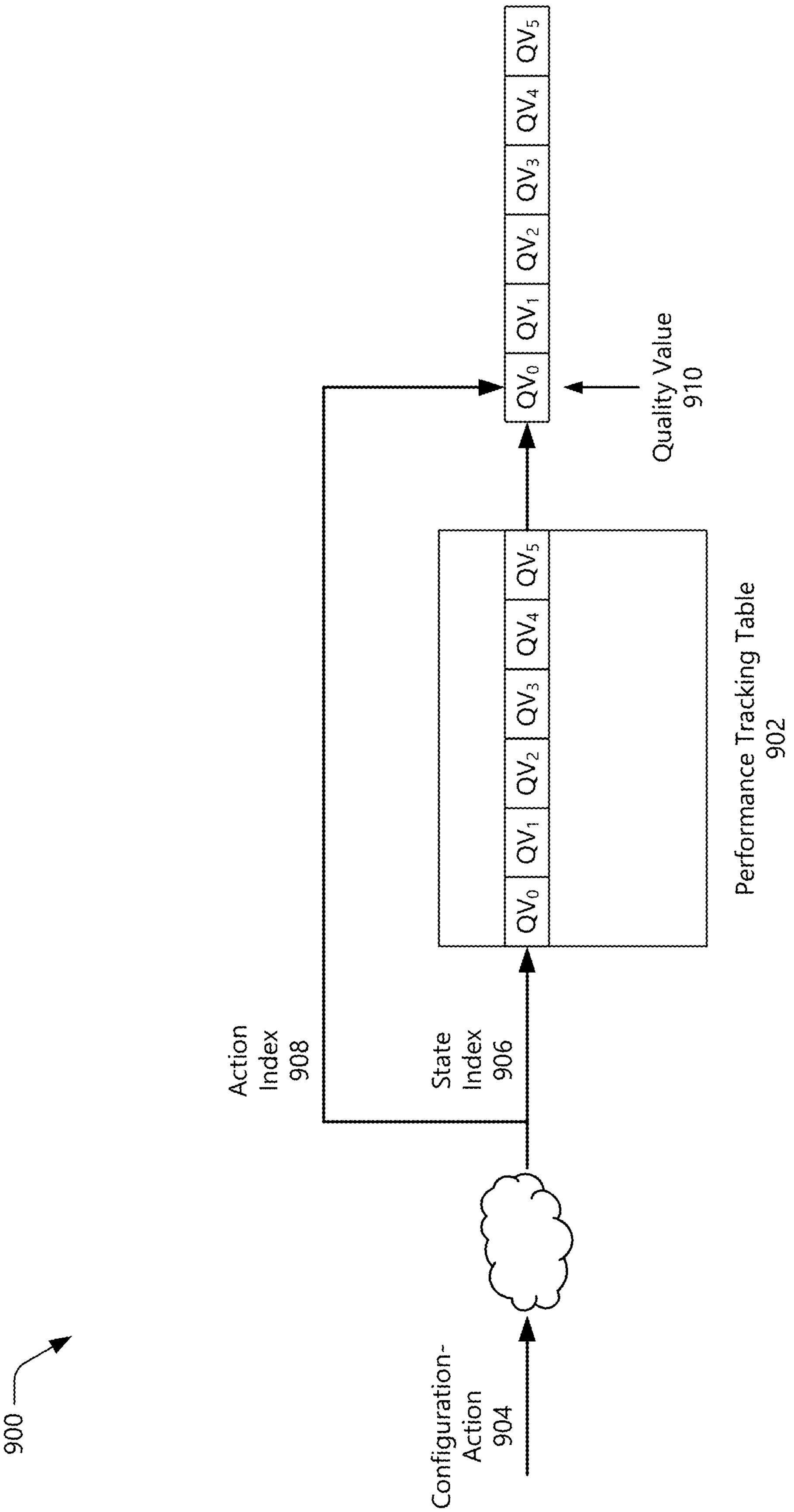
FIG. 9 depicts an example flow diagram for determining a quality value for a queue configuration in accordance with one or more aspects.

FIG. 8 depicts an example method 800 for configuring queue management settings with machine learning in accordance with one or more aspects. The operations of the method 800 may be implemented by a switch controller 126, queues 132, an ML-enabled queue manager 144, or an ML algorithm 146 of a network switch device 114. Generally, the operations of the method 800 may implement tuning of queue management parameters that consist of a set of episodes (iterative on operation 816) of multiple steps (iterative on operation 818). In aspects, an episode can start from a randomized starting configuration of multiple queue management settings (e.g., $\text{Min}_{Th}$, $\text{Max}_{Th}$, $\text{Max}_P$) and complete episodes of multiple steps in which settings are adjusted and corresponding performance is measured. In aspects, the settings or thresholds correspond to a minimum threshold at which the probability for action (e.g., packet marking or packet dropping) by a given policy is a minimum value and/or a maximum threshold at which the probability for action is a maximum value. Alternatively or additionally, the ML-enable queue manager 144 can define or set a slope of a line and intercepts with a minimum value (e.g., 0) and a maximum probability. In yet other cases, the ML-enable queue manager 144 can define or set a non-linear curve, such as a piece-wise curve for which the manager can set one or more segments (e.g., segments between a minimum threshold and maximum threshold of different respective slope).

At 802, an ML-enabled queue manager initializes a performance tracking table for a queue of a network device. In aspects, an ML-enabled queue manager generates and maintains a performance tracking table that includes a quality value or score for each configuration (queue management setting value) and action (increase or decrease of that value) implemented during the machine learning process. When starting an optimization of one or more queue management settings, the performance tracking table can be initialized to zero. In the context of machine learning, the ML-enabled queue manager may implement a SARSE, Q-learning, TD-learning, TD-lambda, or other algorithm to learn the optimal action-value function for configuring values of the queue configuration parameters, such as for ECN, WRED, priority flow control, or other queue policies.

To do so, the ML-enabled queue manager can implement a table (e.g., Q-table or SARSA value table) to maintain expected rewards for taking different actions in different states. Generally, the ML-enabled queue manager updates the table based on the rewards received from the network environment and the expected rewards of the next state. As described herein, the ML-enabled queue manager may generate scores and update the performance tracking table during the episodes and steps of optimizing queue setting through aspects of the ML-enabled queue management. By way of example, consider FIG. 9 which depicts at 900 an example flow diagram for determining a quality value for a queue configuration in accordance with various aspects. In aspects, the ML-enabled queue manager can use a performance tracking table 902 to maintain values for various states and actions. In this example, a configuration 904 (e.g., a queue management setting value and increase or decrease of that value) can be separated into a state index value 906 and an index value 908, which indicate a corresponding entry of the performance tracking table. As episodes of steps are implemented by the ML-enabled queue manager, a quality value 910 that indicates a reward for each action taken. In aspects, a performance tracking table may be configured with a reasonable starting point (i.e. not initialized to zero or random values, but some reasonable starting points based on expertise of the switch vendor or network operator). By so doing, a convergence time toward optimized settings for a queue management policy can be accelerated.

At 804, the ML-enabled queue manager randomizes queue management settings of the queue. In aspects, an episode starting at 804 begins with a selection of a random combination of queue management settings, such as a minimum threshold, maximum threshold, and maximum probability of a queue management policy. Generally, the random start location for each episode may enable the machine learning algorithm to learn state space, which can result in improved or optimized queue management settings.

At 806, the ML-enabled queue manager adjusts the queue management settings of the queue. In aspects, setting updates may be available for each of the queue management settings. For example, in the context of the minimum threshold, maximum threshold, and maximum probability, increases or decreases of each may be available for a total of six settings updates (e.g., $+\text{Min}_{TH}$, $-\text{Min}_{TH}$, $+\text{Max}_{TH}$, $-\text{Max}_{TH}$, $+\text{Max}_{P}$, $-\text{Max}_{P}$). Generally, there can be regions for which the values could be increased and/or decreased. For example, the maximum threshold must always be greater than the minimum threshold and maximum probability (MaxP) may range from less than 100% up to 100%, such as 80% to 100%, etc. In aspects, ML-enabled queue manager adjust one of the queue management settings and can then wait for the network system to stabilize or settle before measuring the system response associated with adjusting the setting.

The settings may be configured as a predefined number of round-trip times (RTTs) of packets traveling through the network to various endpoints. In various aspects, settings adjustments may be performed periodically, such as every n RTTs, after m samples have been observed, based on if loading of a port, queue, or device exceeds a threshold (e.g., loading reaches or has been greater than 60%, 70%, 80%, 90%, etc.). In some implementations, the ML-enabled queue manager 144 is configured to condition adjustments to periods when a network device has traffic (is loaded), otherwise the adjustment/performance provided by ML-enabled tuning may be reduced. For example, the ML-enabled queue manager 144 may weight data samples (e.g., RTTs or traffic metrics) based on how loaded system is, such as, increasing sampling when packet loading is greater than 50%, and reducing data sampling when loading is less than 10%, etc. such that different polices and/or settings for queue management may be determined. In aspects, the queue management settings can be adjusted based on a sigma greedy policy effective to balance exploration of new states with exploitation of learned performance. The sigma value of the policy may be configured to decay over time such that the machine learning algorithm trends toward optimizing or maximizing queue performance based on performance targets for the networking device. At 808, the ML-enabled queue manager applies the queue management settings to the queue. In aspects, the ML-enabled queue manager applies the queue management settings to the queue using registers or other data structures associated with operation of the queue and correspond queue management policies or protocols.

At 810, the ML-enabled queue manager determines performance statistics for the queue when operating with the queue management settings. Generally, a weighting or importance of a particular performance statistic may vary based on performance goals or thresholds, network attributes, traffic dynamics, traffic types (e.g., lossy, lossless), packet size distribution, and so forth. In some cases, performance statistics or metrics may be measured or filtered based on a policy or traffic class. For example, observed delay may indicate total delay or delay for only low-latency priority or latency sensitive traffic. In other words, the ML-enabled queue manager may ignore or omit classes of traffic that are not directed to performance goals of adjusting or tuning the queue management settings.

At 812, the ML-enabled queue manager resolves a performance score for the queue configured with the queue management settings. In aspects, the ML-enabled queue manager can quantize the performance metric of the queue and concatenate the performance metric of the queue with at least one other score for another performance metric of the queue (e.g., another quantized metric). Alternatively or additionally, a score entry of a performance tracking table that is indexed to the action or value of the queue management setting can be updated based on the concatenated score value of multiple quantized metrics to provide a non-linear mapping of the performance metrics (e.g., performance statistics) to a single value or update of the score entry.

Figure 10:
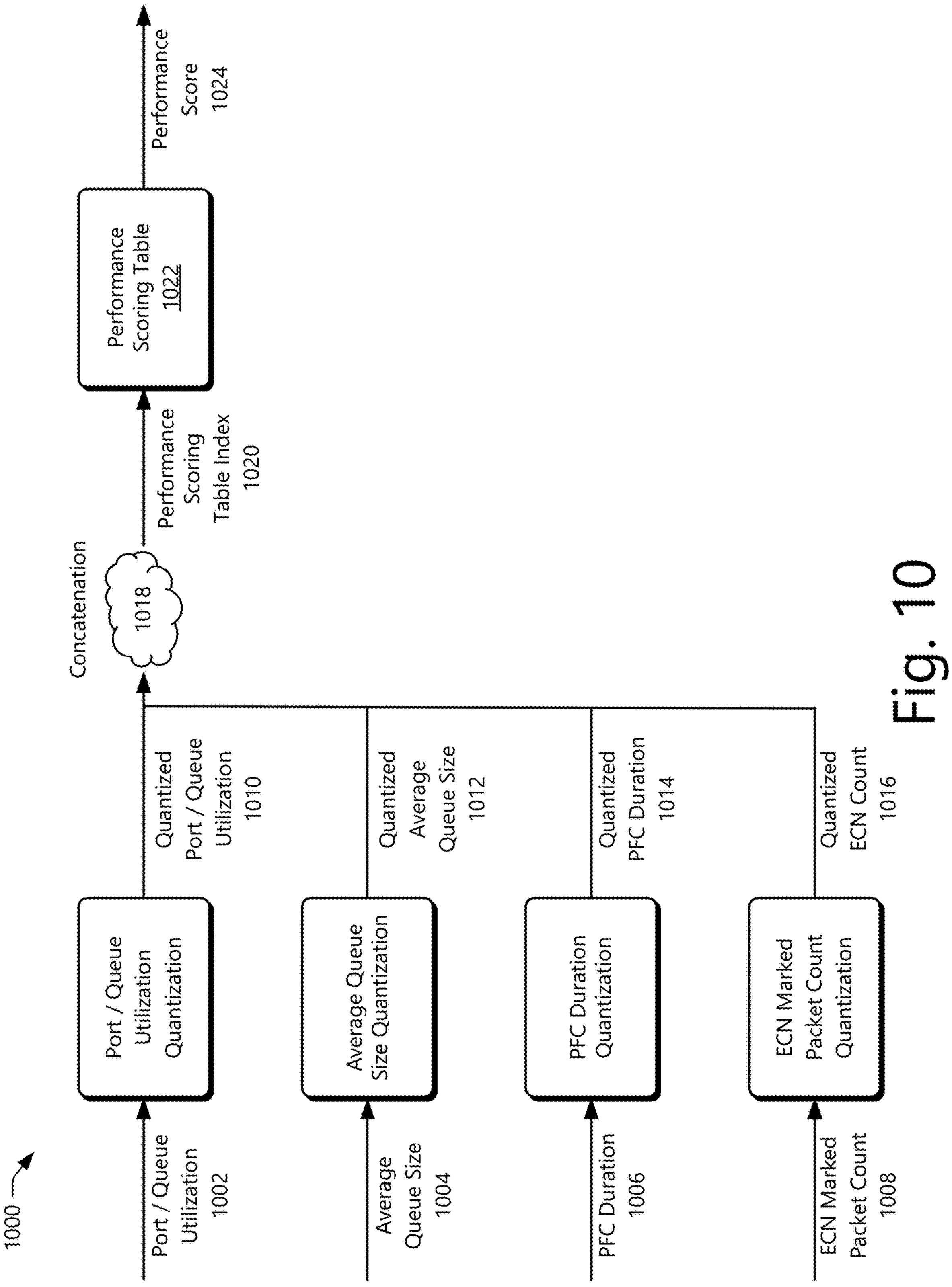
FIG. 10 depicts an example flow diagram for determining a performance score for a queue configuration in accordance with one or more aspects.

By way of example, consider FIG. 10 which depicts at 1000 an example flow diagram for determining a performance score for a queue configuration in accordance with various aspects. The ML-enabled queue manager may obtain performance statistics relating to port/queue utilization 1002, average queue size 1004, PFC duration 1006, and/or ECN marked packet 1008 for a duration of time that the network switch operates and packets traverse the network and queue with one of the adjusted queue management parameters. Generally, these statistics may include large values, which may range from 16 to 32 bits of information per statistical measurement. The ML-enabled queue manager can quantize the statistic value to reduce or constrain the values to a small space, shown here as a quantized port/queue utilization 1010, a quantized average queue size 1012, a quantized PFC duration 1114, and/or a quantized ECN marked packet 1016, which may range from four to eight bits of information per statistical measure. To resolve the statistical measurements further, the ML-enabled queue manager concatenates the quantized values at 1018 to generate a performance scoring table index 1020. The performance scoring table index 1020 can then be used with the performance scoring table 1022 to update the corresponding entry of the index to provide a performance score 1024.

At 814, the ML-enabled queue manager updates the performance tracking table with the performance score for the queue. The ML-enabled queue manager can use the resolved scoring table index to update the corresponding value in the performance tracking table. In aspects, the performance score is mapped into the machine learning algorithm by which a performance score (for the adjusted setting) and configuration update (future adjustment of the setting) are obtained. By way of example, equation 1 below can be used to update entries in the performance tracking table of the machine learning algorithm.

Machine Learning Algorithm

Equation 1

$$PTT^{new}(C_t, a_t) \leftarrow (1-\propto)\cdot PTT(C_t, a_t) + \propto \cdot \overbrace{\left(s_t + \gamma \cdot \max_a PTT(C_{t+1}, a)\right)}^{\text{learned value}}$$

In equation 1, a former score PTT ($C_t$,$a_t$) is discounted by a learning rate (1-α) and added with an estimate of the future value maxPTT ($C_{t+1}$,a), as a max argument, is multiplied by a discount factor γ and performance score $s_t$ to get a new performance tracking table update $PTT^{new}$ by which to update the performance tracking table.

From operation 814, the method 800 may return to operation 806 at 816 to implement another step of the machine learning episode. Alternatively, the method 800 may return to operation 804 at 818 to reinitialize the queue management setting or initialize another one of the queue management settings for another episode of machine learning to optimize tuning of the queue management settings.

FIG. 11 depicts an example method 1100 for adjusting queue management settings with machine learning in accordance with various aspects. The operations of the method 700 may be implemented by a switch controller 126, queues 132, an ML-enabled queue manager 144, or an ML algorithm 146 of a network switch device 114.

At 1102, an ML-enabled queue manager receives one or more performance thresholds for a queue of a network device. In some cases, a user interface of the network switch device present options for selecting or grouping ports and associated queues, and/or for setting or assigning respective performance thresholds for the selected or grouped ports of the network device. In other cases, the ML-enabled queue manager may access default performance thresholds of the network device for the queue or other queues of the device.

At 1104, the ML-enabled queue manager adjusts a queue management setting of a network device with machine learning based on the one or more performance thresholds. For example, the ML-enabled queue manager may adjust a randomized setting, a default setting, or a previous setting of the queue. The ML-enabled queue manager may adjust the queue management setting based on an updated value provided by a machine learning algorithm of the network device. The machine learning algorithm may be configured to adjust or update the queue management value to explore a state space of available settings or to optimize the settings toward the one or more performance thresholds.

At 1106, the ML-enabled queue manager monitors queue performance metrics while the network device operates with the adjusted queue management setting. In some cases, the ML-enabled queue manager monitors the queue performance metrics while the queue processes packets during operation of the switch device. Alternatively or additionally, the ML-enabled queue manager monitors scores resolved for the queue management setting by the machine learning algorithm, such as through a performance score tracking table associated with the machine learning algorithm.

At 1108, the ML-enabled queue manager compares the queue performance metrics with the one or more performance thresholds. For example, the ML-enabled queue manager can compare a latency metric of the queue with a latency performance threshold, compare a throughput metric of the queue with a throughput performance threshold, or a flow control metric of the queue with a flow control performance threshold. From operation 1108, the method 1100 may return to operation 1106 when the performance metrics or performance score for the queue does not exceed the one or more performance thresholds to complete another iteration of operations 1104 to 1108. Alternatively, when the performance metrics or performance score for the queue exceeds the one or more performance thresholds, the method 1100 can proceed to operation 1110.

At 1110, the ML-enabled queue manager applies the adjusted or optimized queue management settings to the queue of the network device. The optimized queue management settings may be determined or resolved after multiple iterations of adjusting the queue management settings based on updated queue management settings provided by the machine learning algorithm of the ML-enabled queue manager. For example, the ML-enabled queue manager may determine at least an optimal threshold value for marking packets, dropping packets, or initiating flow control actions of the queue. In some cases, the ML-enabled queue manager implements sets of respective iterations to determine a minimum threshold, a maximum threshold, and a maximum probability for a queue management policy (e.g., ECN or WRED).

Optionally at 1112, the ML-enabled queue manager initiates readjustment of the queue management settings of the network device with machine learning in response to the performance metrics not exceeding the one or more performance thresholds. In some aspects, the ML-enabled queue manager may continue to monitor performance of the queue after application of the optimized queue management settings. Alternatively or additionally, ML-enabled queue manager can initiate readjustment of the queue management settings at predetermined intervals or randomized times to ensure that the settings are continuously evaluated for optimal network performance.

System-on-Chip and Controller

Figure 12:
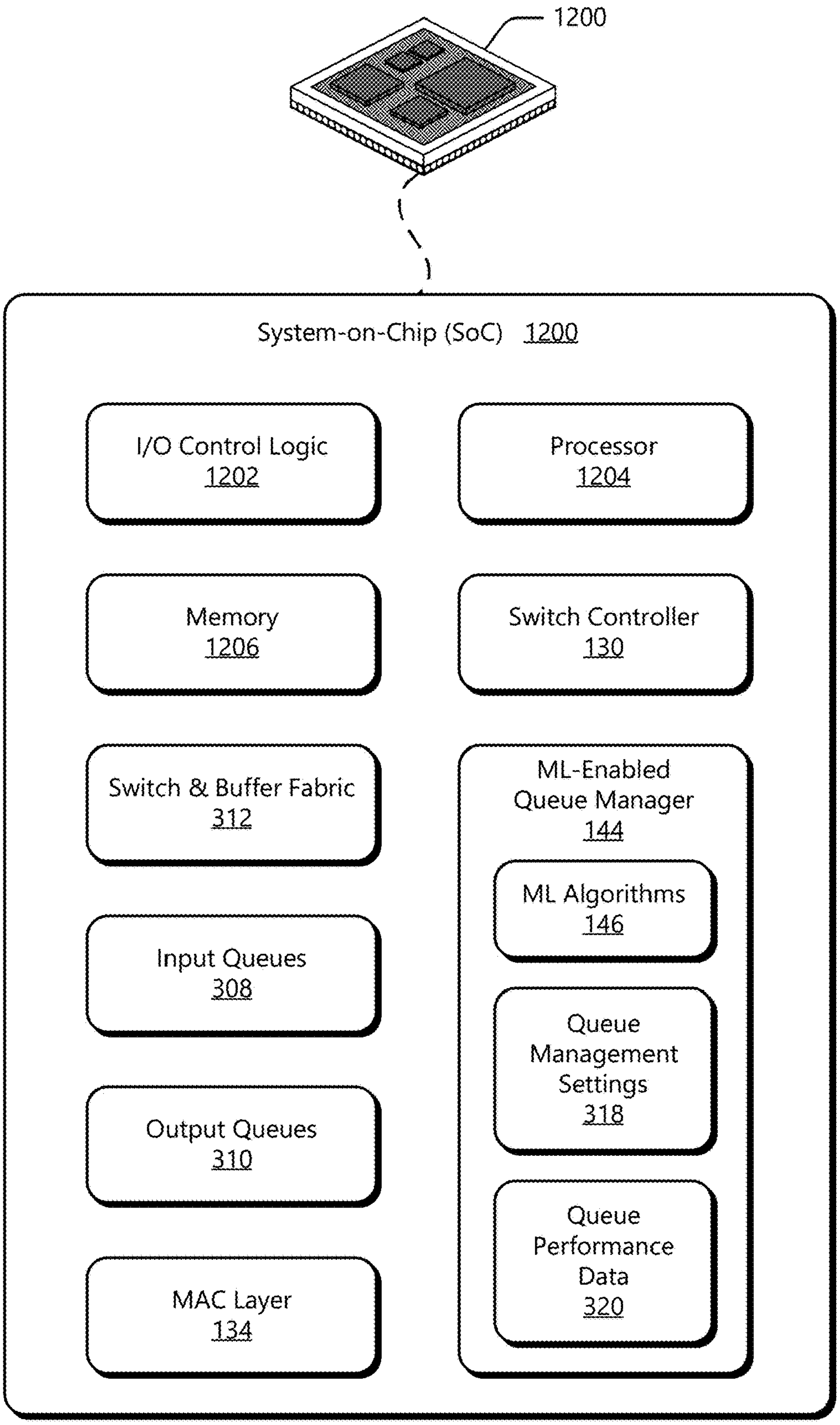
FIG. 12 illustrates an example System-on-Chip (SoC) environment in which aspects of ML-enabled queue management for network devices may be implemented.

FIG. 12 illustrates an example System-on-Chip (SoC) 1200 environment in which various aspects of ML-enabled queue management for network devices may be implemented. The SoC 1200 may be implemented in any suitable system or device, such as a network switch device, router, wireless access point, smart-phone, netbook, tablet computer, access point, network-attached storage, camera, smart appliance, printer, set-top box, server, data storage center, solid-state drive (SSD), hard disk drive (HDD), storage drive array, memory module, automotive computing system, aggregate storage controller, or any other suitable type of device (e.g., others described herein). Although described with reference to a SoC, the entities of FIG. 12 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1200 may be integrated with electronic circuitry, a microprocessor, memory, input-output (I/O) control logic, communication interfaces, firmware, and/or software useful to provide functionalities of a network switch device, computing device, host system, or storage system, such as any of the devices or components described herein (e.g., wireless and/or wired networking equipment). The SoC 1200 may also include an integrated data bus, crossbar, or interconnect fabric (not shown) that couples the various components of the SoC for control signaling, data communication, and/or routing between the components. The integrated data bus, interconnect fabric, or other components of the SoC 1200 may be exposed or accessed through an external port, network data interface, parallel data interface, serial data interface, fabric-based interface, peripheral component interface, or any other suitable data interface. For example, the components of the SoC 1200 may access or control external storage media, solid-state storage media, Flash memory media, magnetic disk media, through an external interface or off-chip data interface.

In this example, the SoC 1200 includes various components such as input-output (I/O) control logic 1202 and a hardware-based processor 1204 (processor 1204), such as a microprocessor, processor core, application processor, DSP, or the like. The SoC 1200 also includes memory 1206, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1204 and code stored on the memory 1206 are implemented as a network switch controller configured to implement functionalities of network switching or routing as described herein. In the context of this disclosure, the memory 1206 can store data, code, instructions, firmware, or other information of the SoC 1200 via non-transitory signals, and does not include carrier waves or transitory signals. Alternately or additionally, SoC 1200 may comprise a data interface (not shown) for accessing additional or expandable off-chip storage media, such as solid-state memory (e.g., Flash or NAND memory), magnetic-based memory media, or optical-based memory media.

The SoC 1200 can include firmware, applications, programs, software, and/or operating system, which may be embodied as processor-executable instructions maintained on the memory 1206 for execution by the processor 1204 to implement functionalities of the SoC 1200. The SoC 1200 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, or physical layer transceivers (PHYs) coupled to the SoC 1200. For example, the SoC 1200 may include one or more transceiver interfaces configured to enable communication over a wired or wireless network, such as to enable the SoC to operate as a controller of a network switch device or other packet routing apparatus.

In this example, the SoC 1200 also includes instances of switch and buffer fabric 312, input queues 308, output queues 310, MAC layer 134, and an ML-enabled queue manager 144, which may be implemented as described herein. In accordance with various aspects of ML-enabled queue management, ML-enabled queue manager 144 may use one or more ML algorithms 146 to train or tune various queue management settings 318 for the input queues 308 and/or output queues 310 of the SoC 1200 or switch controller 126 to optimize packet traffic through a network switch device, which may reduce packet delay, increase packet throughput, and trigger traffic reduction measures to clear queue congestion. Any of these entities may be embodied as disparate or combined components, as described with reference to various aspects presented herein. Examples of these components and/or entities, or corresponding functionality, are described with reference to the respective components or entities of the operating environment 100 of FIG. 1 or respective configurations illustrated in FIGS. 2-6, FIG. 9, and FIG. 10, the methods depicted in FIG. 7, FIG. 8, and FIG. 11, and/or throughout this disclosure.

The ML-enabled queue manager 144, either in whole or in part, may be implemented as processor-executable instructions (e.g., firmware or microcode) maintained by the memory 1206 and executed by the processor 1204 to implement various aspects and/or features of ML-enabled queue management for network devices. The ML-enabled queue manager 144 and ML algorithms 146 may be implemented independently or in combination with any suitable component or circuitry to implement aspects described herein. For example, the ML-enabled queue manager 144 may be implemented as part of a DSP, processor/storage bridge, I/O bridge, graphics processing unit, memory controller, network controller, storage controller, arithmetic logic unit (ALU), or the like. The ML-enabled queue manager 144 may also be provided integral with other entities of SoC 1200, such as integrated with the processor 1204, memory 1206, network interfaces, or firmware of the SoC 1200. Alternately or additionally, the ML-enabled queue manager 144, ML algorithms, and/or other components of the SoC 1200 may be implemented as hardware, firmware, fixed logic circuitry, or any combination thereof.

In the following, some examples of ML-enabled queue management for network devices are described in accordance with one or more aspects:

Example 1: A method for machine learning-enabled queue management for network devices, comprising: initializing a queue management setting with a randomized value; applying the queue management setting to a queue of a network device; operating the network device to process packets through the queue based on the queue management setting; measuring a performance metric of the queue associated with the packets processed through the queue based on the queue management setting; providing, to a machine learning algorithm, an indication of the queue management setting and an indication of the performance metric of the queue; receiving, from the machine learning algorithm, an updated queue management setting based on the queue management setting and the performance metric of the queue; and applying the updated queue management setting to the queue of the network device to configure the queue to process subsequent packets based on the updated queue management setting received from the machine learning algorithm.

Example 2: The method as recited in any example, further comprising: determining a score for the queue management setting based on the performance metric of the queue, and wherein: providing the indication of the performance metric of the queue to the machine learning algorithm comprises providing the score for the queue management setting that is determined based on the performance metric of the queue.

Example 3: The method as recited in any example, wherein determining the score for the queue management setting comprises: quantizing the performance metric of the queue; or concatenating the performance metric of the queue with at least one other score for the queue management setting or at least one other performance metric of the queue.

Example 4: The method as recited in any example, wherein the performance metric is a first performance metric, quantizing the first performance metric provides a first quantized performance metric, and the method further comprises: measuring a second performance metric of the queue associated with the packets processed through the queue based on the queue management setting; quantizing the second performance metric of the queue to provide a second quantized performance metric; and concatenating the first quantized performance metric and the second quantized performance metric to provide the score.

Example 5: The method as recited in any example, wherein the performance metric of the queue comprises one of: a utilization rate for a port associated with the queue; a utilization rate for the queue; or an average occupancy of the queue.

Example 6: The method as recited in any example, wherein the queue management setting comprises one of: a threshold for the queue to trigger a priority flow control event; a threshold for the queue to trigger a packet drop policy; or a threshold for the queue to trigger a packet marking policy.

Example 7: The method as recited in any example, wherein the queue management setting comprises one of: a duration of one or more priority flow control events initiated by the queue based on the queue management setting; a number of packets dropped by the queue based on the queue management setting and in accordance with the packet drop policy; or a number of packets marked based on the queue management setting and in accordance with the packet marking policy.

Example 8: The method as recited in any example, wherein: the queue is configured with a priority flow control, PFC, protocol by which the queue initiates the one or more priority flow control events; the packet drop policy comprises a weighted random early detection, WRED, policy and the threshold comprises a minimum threshold for dropping packets, a maximum threshold for dropping packets, or a maximum probability for dropping packets; or the packet drop policy comprises an explicit congestion notification, ECN, policy and the threshold comprises a minimum threshold for marking packets, a maximum threshold for marking packets, or a maximum probability for marking packets.

Example 9: The method as recited in any example, further comprising: updating, based on the score for the queue management setting, a score entry in a performance tracking table that is indexed to a value of the queue management setting; and obtaining, from the machine learning algorithm, the updated queue management setting based at least in part on the score entry in the performance tracking table that is updated.

Example 10: The method as recited in any example, wherein the operating, measuring, providing, and receiving are steps of an iterative machine learning episode and each iteration of the episode updates a respective score entry in the performance tracking table, and the method further comprises: comparing at least one of the respective score entries to a performance threshold; and in response to the at least one of the respective score entries exceeding the performance threshold, ceasing the machine learning episode and setting the queue management setting based on a value to which the at least one score entry is indexed.

Example 11: The method as recited in any example, further comprising: operating the network device to process the subsequent packets through the queue based on the updated queue management setting; measuring a second performance metric of the queue associated with the subsequent packets processed through the queue based on the updated queue management setting; providing, to the machine learning algorithm, an indication of the updated queue management setting and an indication of the second performance metric of the queue; and selecting, based on a randomized value, to: obtain another updated queue management setting from the machine learning algorithm by which to update the queue management setting for processing additional packets; or initialize the queue management setting with another randomized value for processing additional packets.

Example 12: The method as recited in any example, further comprising: reducing the randomized value over time effective to increase a likelihood of obtaining updated queue management settings from the machine learning algorithm.

Example 13: The method as recited in any example, wherein the machine learning algorithm comprises one of: a state-action-reward-action-state, SARSA, algorithm; a Q-learning algorithm; a temporal difference, TD, learning algorithm; or a TD lambda algorithm.

Example 14: The method as recited in any example, further comprising: configuring the machine learning algorithm to adjust the queue management setting to: maximize throughput when processing the packets through the queue of the network device; or minimize latency when processing the packet through the queue of the network device.

Example 15: An apparatus comprising: a media access control layer configured to communicate packets through one or more network interfaces; multiple queues configured to buffer packets communicated through the one or more network interfaces; a switch controller configured to route the packets between the multiple queues; and a machine learning-enabled, ML-enabled, queue manager associated with the multiple queues and a machine learning, ML, algorithm and configured to implement, using the ML algorithm, any one of the methods as recited in the examples.

Although the subject matter of ML-enabled queue management for network devices has been described in language specific to structural features and/or methodological operations, it is to be understood that the subject matter defined in the appended claims is not necessarily limited to the specific examples, features, configurations, or operations described herein, including orders in which they are performed.

What is claimed is:

1. A method for machine learning-enabled queue management for network devices, comprising:
  initializing, with a randomized value, a queue management threshold configured to trigger a queue management event or a queue management policy;
  applying the queue management threshold to a queue of a network device;
  operating the network device to process packets through the queue based on the queue management threshold, the queue management threshold with the randomized value triggering the queue management event or the queue management policy for the queue through which the packets are processed;

measuring a performance metric of the queue associated with the packets processed through the queue based on the queue management threshold;

providing, to a machine learning algorithm, an indication of the queue management threshold and an indication of the performance metric of the queue;

receiving, from the machine learning algorithm, an updated queue management threshold based on the queue management threshold and the performance metric of the queue; and applying the updated queue management threshold to the queue of the network device to configure the queue to process subsequent packets based on the updated queue management threshold being configured to trigger the queue management event or queue management policy.

2. The method as recited in claim 1, further comprising:

determining a score for the queue management threshold based on the performance metric of the queue, and wherein:

providing the indication of the performance metric of the queue to the machine learning algorithm comprises providing the score for the queue management threshold that is determined based on the performance metric of the queue.

3. The method as recited in claim 2, wherein the performance metric is a first performance metric and the method further:

quantizing the first performance metric of the queue to provide a first quantized performance metric; measuring a second performance metric of the queue associated with the packets processed through the queue based on the queue management threshold;

quantizing the second performance metric of the queue to provide a second quantized performance metric; and concatenating the first quantized performance metric of the queue with the second quantized performance metric of the queue to provide the score for the queue management threshold.

4. The method as recited in claim 3, further comprising:

measuring a third performance metric of the queue associated with the packets processed through the queue based on the queue management threshold, the third performance metric being a different type of performance metric than the first performance metric and the second performance metric;

quantizing the third performance metric of the queue to provide a third quantized performance metric; and concatenating the first quantized performance metric, the second quantized performance metric, and the third quantized performance metric to provide the score.

5. The method as recited in claim 4, wherein:

the first quantized performance metric comprises, for a duration of time within a learning phase of the machine learning algorithm, a quantized utilization rate for the queue or a port associated with the queue;

the second quantized performance metric comprises, for the duration of time within the learning phase of the machine learning algorithm, a quantized average occupancy of the queue;

the third quantized performance metric comprises, for the duration of time within the learning phase of the machine learning algorithm, a quantized duration of one or more packet flow control events of the queue; and the score is provided based on concatenating the quantized utilization rate for the queue or a port associated with the queue, the quantized average occupancy of the queue, and the quantized duration of one or more packet flow control events of the queue.

6. The method as recited in claim 2, further comprising:

updating, based on the score for the queue management threshold, a score entry in a performance tracking table that is indexed to a value of the queue management threshold; and obtaining, from the machine learning algorithm, the updated queue management threshold based at least in part on the score entry in the performance tracking table that is updated.

7. The method as recited in claim 1, wherein the performance metric of the queue comprises one of:

a utilization rate for a port associated with the queue;

a utilization rate for the queue; or an average occupancy of the queue.

8. The method as recited in claim 1, wherein the queue management threshold comprises one of:

a threshold for the queue to trigger a priority flow control event;

a threshold for the queue to trigger a packet drop policy; or a threshold for the queue to trigger a packet marking policy.

9. The method as recited in claims 8, wherein the queue management threshold comprises one of:

a duration of one or more priority flow control events initiated by the queue based on the queue management threshold;

a number of packets dropped by the queue based on the queue management threshold and in accordance with the packet drop policy; or a number of packets marked based on the queue management threshold and in accordance with the packet marking policy.

10. The method as recited in claim 9, wherein:

the queue is configured with a priority flow control, PFC, protocol by which the queue initiates the one or more priority flow control events;

the packet drop policy comprises a weighted random early detection, WRED, policy and the threshold comprises a minimum threshold for dropping packets, a maximum threshold for dropping packets, or a maximum probability for dropping packets; or the packet drop policy comprises an explicit congestion notification, ECN, policy and the threshold comprises a minimum threshold for marking packets, a maximum threshold for marking packets, or a maximum probability for marking packets.

11. A network device comprising:

one or more network ports;

one or more network interfaces coupled to respective ones of the one or more network ports;

a media access control layer configured to communicate packets through the one or more network interfaces;

multiple queues configured to buffer packets communicated through the one or more network interfaces;

a switch controller configured to route the packets between the multiple queues; and a machine leaning-enabled (ML-enabled) queue manager associated with the multiple queues and a machine learning, ML, algorithm and configured to:

initialize, with a randomized value and for a queue of the multiple queues, a queue management threshold configured to trigger a queue management policy of the queue;

apply the queue management threshold to the queue of the network device;

operate the network device to process packets through the queue based on the queue management threshold, the queue management threshold triggering the queue management policy for the queue through which the packets are processed;

measure a performance metric of the queue associated with the packets processed through the queue based on the queue management threshold;

provide, to a machine learning algorithm, an indication of the queue management threshold and an indication of the performance metric of the queue;

receive, from the machine learning algorithm, an updated queue management threshold based on the queue management threshold and the performance metric of the queue; and apply the updated queue management threshold to the queue of the network device to configure the queue to process subsequent packets based on the updated queue management threshold being configured to trigger the queue management policy of the queue.

12. The network device as recited in claim 11, wherein the ML-enabled queue manager is further configured to:

determine a score for the queue management threshold based on the performance metric of the queue, and wherein:

to provide the indication of the performance metric of the queue to the machine learning algorithm, the ML-enabled queue manager provides the score for the queue management threshold that is determined based on the performance metric of the queue.

13. The network device as recited in claim 11, wherein:

the performance metric of the queue comprises one of a utilization rate for a port associated with the queue, a utilization rate for the queue, or an average occupancy of the queue; and the queue management threshold comprises one of a threshold for the queue to trigger priority flow control policy, a threshold for the queue to trigger a packet drop policy, or a threshold for the queue to trigger a packet marking policy.

14. The network device as recited in claim 11, wherein the ML-enabled queue manager is further configured to:

operate the network device to process the subsequent packets through the queue based on the updated queue management threshold;

measure a second performance metric of the queue associated with the subsequent packets processed through the queue based on the updated queue management threshold;

provide, to the machine learning algorithm, an indication of the updated queue management setting threshold and an indication of the second performance metric of the queue; and select, based on a randomized value, to:

obtain another updated queue management threshold from the machine learning algorithm by which to update the queue management threshold for processing additional packets; or initialize the queue management threshold with another randomized value for processing additional packets.

15. The network device as recited in claim 14, wherein the ML-enabled queue manager is further configured to:

reduce the randomized value over time effective to increase a likelihood of obtaining updated queue management thresholds from the machine learning algorithm.

16. A system-on-chip (SoC) comprising:

a media access control layer configured to communicate packets through one or more network interfaces;

multiple queues configured to buffer packets communicated through the one or more network interfaces;

a switch controller configured to route the packets between the multiple queues; and a machine learning-enabled (ML-enabled) queue manager associated with the multiple queues and a machine learning, ML, algorithm and configured to:

initialize, with a randomized value and for a queue of the multiple queues, a queue management threshold of a queue management policy for the queue, the randomized value reduced over time;

apply the queue management threshold to the queue of the SoC;

operate the SoC to process packets through the queue based on the queue management threshold;

measure a performance metric of the queue associated with the packets processed through the queue based on the queue management threshold;

provide, to a machine learning algorithm, an indication of the queue management threshold and an indication of the performance metric of the queue;

receive, from the machine learning algorithm, an updated queue management threshold based on the queue management threshold and the performance metric of the queue; and apply the updated queue management threshold to the queue of the SoC to configure the queue to process subsequent packets based on the updated queue management threshold of the queue management policy of the queue.

17. The SoC as recited in claim 16, wherein the ML-enabled queue manager is further configured to:

determine a score for the queue management threshold based on the performance metric of the queue, and wherein:

to provide the indication of the performance metric of the queue to the machine learning algorithm, the ML-enabled queue manager provides the score for the queue management threshold that is determined based on the performance metric of the queue.

18. The SoC as recited in claim 17, wherein to determine the score for the queue management threshold, the ML-enabled queue manager is configured to:

quantize the performance metric of the queue; or concatenate the performance metric of the queue with at least one other score for the queue management setting threshold or at least one other performance metric of the queue.

19. The SoC as recited in claim 16, wherein:

the performance metric of the queue comprises one of a utilization rate for a port associated with the queue, a utilization rate for the queue, or an average occupancy of the queue; and the queue management threshold comprises one of a threshold for the queue to trigger a priority flow control event, a threshold for the queue to trigger a packet drop policy, or a threshold for the queue to trigger a packet marking policy.

20. The SoC as recited in claim 16, further comprising a processor, a machine learning engine, or an artificial intelligence engine configured to implement the machine learning algorithm.

* * * * *